(12) United States Patent
Pieterkosky

(10) Patent No.: US 10,882,591 B2
(45) Date of Patent: Jan. 5, 2021

(54) MODULAR BIOMIMETIC UNDERWATER VEHICLE

(71) Applicant: Aquaai Corporation, Coronado, CA (US)

(72) Inventor: Simeon Marc Pieterkosky, Coronado, CA (US)

(73) Assignee: AQUAAI CORPORATION, New York, NY (US)

( * ) Notice: Subject to any disclaimer, the term of this patent is extended or adjusted under 35 U.S.C. 154(b) by 161 days.

(21) Appl. No.: 16/179,937

(22) Filed: Nov. 3, 2018

(65) Prior Publication Data

US 2019/0135393 A1    May 9, 2019

Related U.S. Application Data

(60) Provisional application No. 62/581,618, filed on Nov. 3, 2017.

(51) Int. Cl.

| | |
|---|---|
| *B63G 8/00* | (2006.01) |
| *B63G 8/08* | (2006.01) |
| *B63H 1/36* | (2006.01) |
| *B63J 99/00* | (2009.01) |
| *B63B 35/44* | (2006.01) |
| *G06T 7/20* | (2017.01) |
| *G06K 9/00* | (2006.01) |
| *B63B 79/00* | (2020.01) |

(52) U.S. Cl.
CPC .............. *B63G 8/001* (2013.01); *B63B 35/44* (2013.01); *B63G 8/08* (2013.01); *B63H 1/36* (2013.01); *B63J 99/00* (2013.01); *G06K 9/00624* (2013.01); *G06T 7/20* (2013.01); *B63B 79/00* (2020.01); *B63B 2035/4453* (2013.01); *B63G 2008/002* (2013.01); *G06T 2207/30252* (2013.01)

(58) Field of Classification Search
CPC .......... B63G 8/001; B63G 8/08; B63B 35/44; B63B 79/00
See application file for complete search history.

(56) References Cited

U.S. PATENT DOCUMENTS

| | | | | |
|---|---|---|---|---|
| 5,740,750 A | * | 4/1998 | Triantafyllou | B63B 1/36 114/67 R |
| 6,089,178 A | * | 7/2000 | Yamamoto | B63H 1/36 114/337 |
| 6,138,604 A | * | 10/2000 | Anderson | B63G 8/08 114/332 |
| 6,835,108 B1 | * | 12/2004 | Gieseke | B63H 1/36 440/14 |
| 7,865,268 B2 | * | 1/2011 | Valdivia y Alvarado | A01K 85/18 700/245 |

(Continued)

FOREIGN PATENT DOCUMENTS

| | | |
|---|---|---|
| CN | 101033000 A | 9/2007 |
| CN | 102303700 A | 1/2012 |

(Continued)

*Primary Examiner* — S. Joseph Morano
*Assistant Examiner* — Jovon E Hayes
(74) *Attorney, Agent, or Firm* — Thibault Patent Group

(57) ABSTRACT

Embodiments of the present invention are directed to a modular, biomimetic, underwater vehicle capable of propulsion using one or more tail undulation methods, such as anguilliform or carangiform propulsion methods.

19 Claims, 18 Drawing Sheets

(56) References Cited

U.S. PATENT DOCUMENTS

| | | | | |
|---|---|---|---|---|
| 9,090,320 | B2* | 7/2015 | Rufo | B63H 1/36 |
| 9,937,986 | B1* | 4/2018 | Oh | B63G 8/08 |
| 10,661,869 | B2* | 5/2020 | Freeman | H01L 41/09 |
| 2003/0029257 | A1* | 2/2003 | Kerrebrock | F16H 21/46 |
| | | | | 74/25 |
| 2006/0000137 | A1* | 1/2006 | Valdivia y Alvarado | |
| | | | | A01K 85/01 |
| | | | | 43/42.2 |
| 2012/0298030 | A1* | 11/2012 | Lee | B60L 53/38 |
| | | | | 114/337 |
| 2014/0109821 | A1* | 4/2014 | Rufo | B63H 1/36 |
| | | | | 114/337 |
| 2014/0343728 | A1 | 11/2014 | Jun et al. | |
| 2018/0281913 | A1* | 10/2018 | Garthwaite | B63G 8/08 |
| 2019/0135393 | A1* | 5/2019 | Pieterkosky | B63J 99/00 |
| 2019/0152573 | A1* | 5/2019 | Wiens | B63G 8/001 |
| 2020/0115018 | A1* | 4/2020 | Aukes | B25J 9/003 |
| 2020/0142415 | A1* | 5/2020 | Oh | G01V 11/00 |

FOREIGN PATENT DOCUMENTS

| | | |
|---|---|---|
| CN | 106184676 A | 12/2016 |
| CN | 106828848 A | 6/2017 |

* cited by examiner

MODULAR BIOMIMETIC UNDERWATER VEHICLE

CROSS-REFERENCE TO RELATED APPLICATIONS

The present application claims the benefit of U.S. Provisional Application No. 62/581,618, filed on Nov. 3, 2017, the entirety of which is incorporated by reference herein.

BACKGROUND

Field of Use

The present application relates generally to robotics in general and more specifically to underwater vehicles.

Description of the Related Art

Much of the subsurface ocean environment remains unexplored due to the combination of harsh, dangerous conditions as well as the vast size of the world's oceans. Due to this harsh environment, oceanographers were early adopters of robotics to aid research and exploration, primarily in the form of remotely-operated vehicles (ROV). While ROVs remove some of the dangers of sending humans into the deep, they do little to overcome the problem of exploring a majority of the oceans, due to their vast size. This is because ROVs are expensive to operate which has limited their proliferation. ROVs typically require a human operator and are often large, complex vehicles designed to operate in tandem with a research vessel for support.

Advances in the fields of computing and energy storage have led to autonomous underwater vehicles (AUV) which strive to reduce the cost of exploring the oceans by removing the need for a human operator. However, many of these vehicles are designed around traditional marine components and concepts—such as propeller-driven thrusters for propulsion. Thrusters are relatively inefficient and typically represent the largest portion of an AUV's power budget. As a result, an AUV's size, weight, and cost are directly proportional to the desired operational range as more volume and weight are required for energy storage. While large size and weight are undesirable, cost is the major barrier to proliferation.

One of the main obstacles in increasing the range AUVs is energy efficiency, as AUVs must to carry their own power supply. However, most autonomous vehicles use mechanical elements such as electrical motors, gearboxes, linkages, cams, pulleys, etc. to transmit power internally even though these have limited efficiencies. Each mechanical element adds a possible point of failure to an AUV, in addition to limiting the efficiency of converting stored energy to propulsion. Further, current mechanical elements generally cannot withstand harsh environments without sophisticated and complex mechanical protection. As a result, most autonomous robot designs are expensive, hard-to-assemble and prone to failures.

It would be desirable, therefore, to offer an underwater vehicle that overcomes the problems identified above.

SUMMARY

It is an object to provide a robust, efficient biomimetic underwater vehicle for carrying a user-configurable sensor package intended for several modes of operation, such as autonomous mode (tethered and untethered), a remote operation mode (tethered), and a manual, dive scooter mode (untethered). In one embodiment, the biomimetic underwater vehicle is configured to resemble a large fish.

The mechanisms for propulsion in the embodiments described herein are simple and mechanically robust. They may have as few as one actuator, which excites a compliant, tail portion of an underwater vehicle to simulate natural movement of a living marine animal. Comparable to current robotic aquatic systems, a compliant, tail-like approach to biomimetic locomotion has significant advantages, as mechanisms are simpler and more robust than traditional mechanical systems used in prior art AUVs, and performance achieved is comparable or better.

Another object is to provide a biomimetic vehicle comprising a tail portion that can safely house one or more subsystems within an inner cavity, provided that the size of such subsystems do not interfere with flexure of the tail portion. Subsystems may comprise one or more waterproof and pressure resistant propulsion mechanisms, power sources, or other mechanical or electrical systems. This can be achieved by potting electronics in epoxy or housing mechanical elements inside a sealed pressure vessel, filled with either air or a liquid dielectric, such as mineral oil. The inner cavity is ideal to house such subsystems, since it reduces powered wire lengths and the cavity, when flooded with water, provides a natural heat sink.

It is a further object to make the subsystems easily replaceable for onsite repairs, scheduled maintenance, and for purposes of onsite configurability, i.e., the ability to quickly modify an underwater vehicle to achieve a particular performance characteristic, such as extended range, payload capability, buoyancy, etc.

Another objective of embodiments of this invention is to provide a robust, inexpensive, modular platform for long-term, always-on maritime observations. Autonomous, untethered operation may provide greater than four hours of operation between battery charges in one embodiment, while autonomous, tethered operation may provide around the clock operation via charging from a surface-based vessel, such as a boat, buoy or other floating platform.

Another objective is to provide a dive scooter, which provides underwater transportation to a diver/operator for relatively short periods of time, such as one-half hour between charges. Given the flexible nature of this platform, possible applications are far reaching (with appropriate choice of sensor payload) including, but not limited to, monitoring of aquaculture facilities (for both water quality and health of fish (e.g. presence of sea lice)), monitoring of harbors (shifts in silt deposits, channel depth, water quality), scientific research including visual monitoring, data logging of sensors, photogrammetry, and water safety including monitoring beach waterfronts for the presence of sharks, water rescues, and always-on water quality monitoring.

Embodiments of the present application are directed towards a biomimetic, underwater vehicle, comprising a head portion and a tail portion, the tail portion comprising a flexible skin forming an enclosure that defines a shape of the tail portion, an actuator, a first linkage comprising a first end coupled to a first portion of the actuator and a second end coupled to a first connection point located at a rear end of the tail portion, a second linkage comprising a first end coupled to a second portion of the actuator and a second end coupled to a second connection point located at the rear end of the tail portion, wherein the flexible skin bends in a first lateral direction when the actuator is activated in a first direction, and bends in a second lateral direction when the actuator is activated in a second direction, providing a first mode of propulsion to the biomimetic, underwater vehicle

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Embodiments of the present invention describe a modular, bio-inspired underwater vehicle ("BIV") for use in scientific research, exploration, watercraft maintenance, fishery maintenance, and other applications in both fresh and saltwater settings. It should be understood that the term "vehicle", as used herein, is not intended to be restricted to a machine that transports people or cargo. Rather, this term is intended to refer to any mechanical propulsion device intended to operate underwater for the purposes as described above. Embodiments of a BIV comprise an aquatic robot or drone whose main propulsion mimics the swim patterns of a living marine animal, such as a fish. This type of propulsion is much more energy-efficient a propeller-based thruster, commonly used in the prior art. As a result, embodiments of a BIV can achieve the same or better operational time as a thruster-based AUV using the same or smaller energy storage unit. By reducing the size and, thus, the weight of the energy storage unit, the cost to manufacture BIVs is reduced relative to traditional AUVs.

Two, major forms of locomotion, or "modes", are described in detail herein: anguilliform locomotion, in which a tail portion of a BIV undulates along a length of the tail portion and carangiform locomotion, in which undulations are concentrated near the end of the tail portion. Other modes of locomotion are contemplated as well, including sub-carangiform, thunniform and ostriciiform. Embodiments of the BIV as described herein are capable of one or more modes of location.

Figure 1:
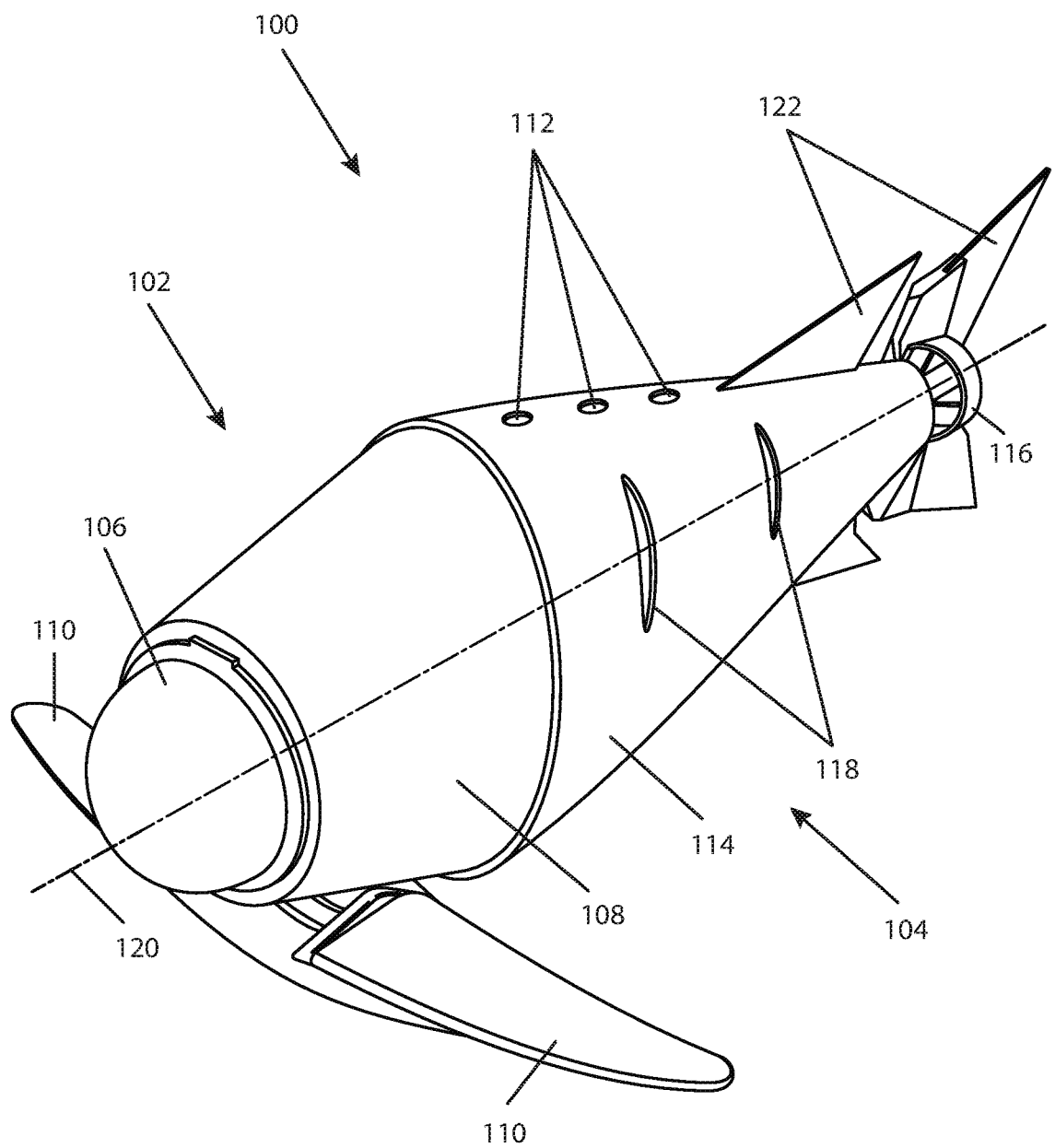
FIG. 1 is a perspective view of one embodiment of a modular, biomimetic underwater vehicle.

FIG. 1 is a perspective view showing one embodiment of a BIV 100, comprising head portion 102 and tail portion 104. Tail portion 104 is responsible for propulsion of BIV 100 via an efficient, fish-like swim pattern, a traditional electric thruster, or a combination thereof. An additional feature of tail portion 104 is that it may be hollow, allowing for the placement of vital onboard systems such as power management, buoyancy control, propulsion, etc. For reference purposes, FIG. 1 illustrates longitudinal axis 120.

In this embodiment, head portion 102 is removably attached to tail portion 104 via traditional securing means, such as one or more latches, screws, bolts or other well-known mechanical fastening devices that allow easy assembly and removal of head portion 102 from tail portion 104. Head portion 102 may also comprise space to house onboard systems (either redundant or in addition to those located in the tail) such as a power source, computer control/navigation circuitry, communications circuitry, and sensors.

While the overall size and shape of BIV 100 can be scaled larger or smaller depending upon user needs, the embodiment described in FIG. 1 is approximately 130 cm in length. At its widest, where head portion 102 joins tail portion 104, the cross section is typically best approximated by an oval comprising a semi-major diameter of approximately 30 cm in height and a semi-minor diameter of approximately 20 cm in width. From the joining boundary between head portion 102 and tail portion 104 to the rear end of tail portion 104, these diameters taper, in one embodiment, approximately linearly, for greater hydrodynamic efficiency during tail oscillation (though the taper can take on other shapes). From the boundary between head portion 102 and tail portion 104 to the front end of head portion 102, in this embodiment, these diameters taper to a lesser extent, allowing for a more cylindrical shape, ending with domed viewing port 106. With these dimensions, BIV 100 may achieve long mission durations (for example, greater than 4 hours between power source replenishment), allowing a power source of considerable size. In general, the size of BIV 100 is correlated with the mission duration; larger BIVs are generally able to achieve longer mission durations than smaller BIVs, due to the ability for larger BIVs to accommodate larger power sources.

Referring back to FIG. 1, in addition to domed viewing port 106, head portion 102 comprises cowl 108, and dive fins 110. Domed viewing port 106 generally comprises a hemispherical structure intended to allow visual observation of an area in front of BIV 100 from inside head portion 102, either by one or more cameras, sensors, and/or by a human being. The camera(s) may be used to provide digital images of the surrounding environment for purposes of navigation, identification of desired objects or marine life, and/or for detecting oncoming objects or marine life. One or more sensors may be used to aid the camera(s) in performance of these functions, for example, one or more infra-red distance sensors for determining a distance between BIV 100 and an oncoming object or marine animal. Domed viewing port 106 is manufactured from a transparent material, such as glass, plexiglass, plastic, polymethyl, polymethacrylate, or some other robust, transparent material able to withstand pressures that are encountered when BIV 100 is operating at great depths. In other embodiments, domed viewing port 106 may comprise a circular, (or other geometric shapes) flat, transparent material offering a more limited view of the surrounding environment in front of BIV 100.

Cowl 108 forms the general, exterior shape of head portion 102, and is generally constructed from a rigid material such as fiberglass or one of a variety of plastics. In the embodiment shown in FIG. 1, cowl 108 is linearly tapered, to minimize hydrodynamic resistance produced by BIV 100 as it travels through the water.

Dive fins 110 are typically located underneath head portion 102 and are used for stability, depth control, and/or steering. Dive fins 110 can be operated as a pair or individually depending upon the application. Since BIV 100 is typically operated at neutral or near-neutral buoyancy, depth may be controlled through a combination of forward motion of BIV 100 and a pitch at which dive fins 110 are positioned, generally by one or more motors and/or gears. Dive fins 110 may also act to stabilize any rolling motion of BIV 100, and also to dampen lateral movement of head portion 102 due to momentum transfer from tail portion 104 as tail portion 104 undulates during forward propulsion. As such, dive fins 110 are designed to have low hydrodynamic resistance longitudinally along the length of BIV 100, and higher hydrodynamic resistance to motion laterally, or side to side.

Dive fins 110 may be rotated to act as an elevator, or up/down rudder, to cause BIV 100 to ascend or dive as BIV 100 is propelled forward. Steering may be achieved by rotation of one dive fin but not the other, causing BIV 100 to turn in the direction of the rotated dive fin, due to the increased hydrodynamic resistance presented by the rotated dive fin.

As mentioned previously, BIV 100 is generally constructed to be approximately neutrally buoyant, or slightly positive. Achieving buoyancy is complicated due to compressibility of the tail and, therefore, an air pocket formed inside tail portion 104. As BIV 100 changes depth, the air pocket may experience different pressures, causing variable displacement. As such, tail portion 104 may comprise ports 112 formed through a flexible membrane that forms the "skin" 114 of tail portion 104, allowing tail portion 104 it to flood when placed in water, for buoyancy and/or mechanical purposes. Some amount of closed cell, buoyancy foam, or the like, may be placed inside tail portion 104 to maintain a relatively incompressible volume inside tail section 104 in order to achieve a desired buoyancy. Fine tuning of the buoyancy may be achieved by adding weights or buoyancy foam to small pockets placed along the bottom and/or top of the exterior surface of skin 114. Head portion 102 may be balanced by adding weights and/or buoyancy foam inside or within similar pockets as tail portion 104, which may be located between the cowling and a pressure hull, described later herein. Depending upon overall performance requirements (for example, depth and dive speed), a buoyancy engine can be added inside the tail to aid the dive control offered by dive planes.

In one embodiment, tail portion 104 comprises a conventional, submersible propulsion unit, referred to herein as thruster 116, comprising two or more axial blades that rotate in a first direction to provide thrust in a forward direction. Optionally, the blades may be rotated in a reverse direction that causes BIV to move backward. In one embodiment, thruster 116 is affixed to a rear end of tail portion 104 by traditional mechanical mounting techniques. While BIV 100 may be fully functional without thruster 116, able to propel BIV 100 by way of anguilliform and/or carangiform movements, as described later herein, the use of thruster 116 may provide certain advantages. For example, in one embodiment, thruster 116 may be used to propel BIV 100 more quickly, or for longer distances, in a straight heading when tail portion 104 is held in a straight, streamlined position—more so than propulsion using anguilliform or carangiform oscillation techniques alone.

In another embodiment, thruster 116 may be activated when tail portion 104 held in a fixed "bent" or flexed position in one direction or the other in a horizontal plane. In this embodiment, activation of thruster 116 while tail portion is held in a flexed position causes BIV 100 to turn quickly and sharply. This may be helpful to avoid collisions with fast-approaching other vessels or marine life. In this embodiment, BIV 100 may be propelled using anguilliform or carangiform motion until an object or marine animal is detected by an onboard camera or sensor. Upon detection of such object or marine animal, tail portion 104 may be quickly positioned in a maximum horizontal direction and then thruster 116 activated, causing a rapid change in direction of BIV 100.

In yet another embodiment, thruster 116 may be activated when tail portion 104 is oscillating in an anguilliform or carangiform fashion. This technique may be used to help steer BIV 100, as well as to minimize "head bob" of head portion 102, as anguilliform or carangiform tail motion tends to cause an opposing motion of head portion 102. In this embodiment, thruster 116 may be activated when tail portion 104 reaches one or more states or positions, such as when the rear tip of tail portion 104 reaches a maximum displacement from a centerline of BIV 100 during anguilliform or carangiform undulation. In a variation, the speed of rotation of the blades of thruster 116 may be discreetly or continuously adjusted to provide variable thrust as tail portion 104 undulates through a complete propulsion cycle, i.e., beginning at a centerline position (i.e., in-line with longitudinal axis 120, flexing in a first direction in a horizontal plane, returning to the centerline position, flexing in a second direction in the horizontal plane, and finally returning to the centerline. In this example, the speed of the blades may vary continuously in accordance with a sinusoidal that matches the frequency of the propulsion cycle, increasing to a maximum thrust as tail portion 104 is flexed maximally, and decreasing to a minimum speed as tail portion 104 passes through the centerline on its way to flexing in an opposing direction.

Figure 2A:
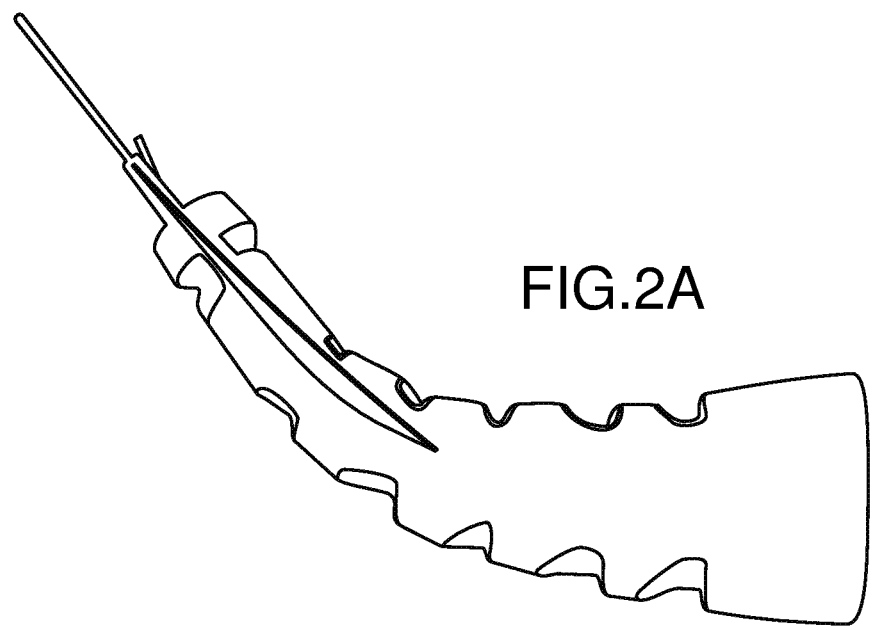
FIGS. 2A and 2B are top, perspective views of a tail portion of the modular, biomimetic underwater vehicle as shown in FIG. 1, shown maximally flexed in opposing anguilliform positions between the views.
Figure 2B:
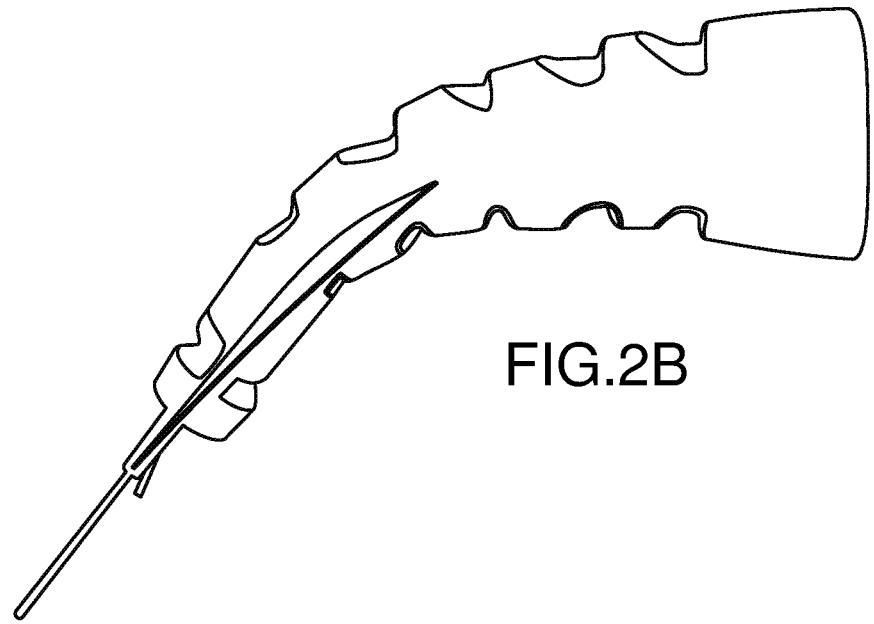
Figure 3A:
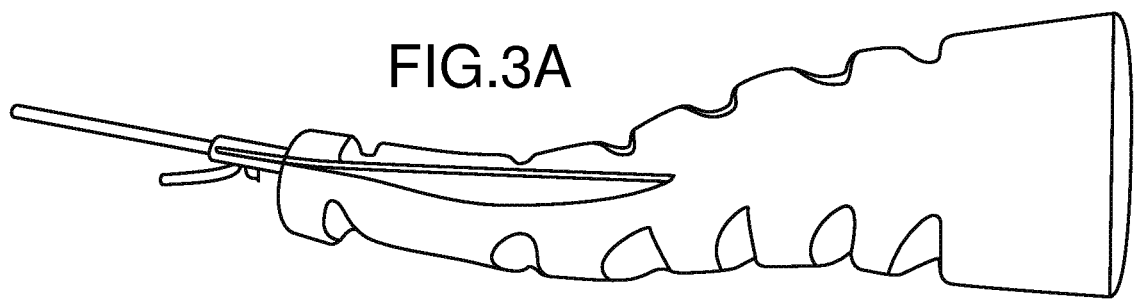
FIGS. 3A and 3B are top, perspective views of the tail portion of the modular, biomimetic underwater vehicle as shown in FIG. 1, shown maximally flexed in opposing carangiform positions between the views.
Figure 3B:
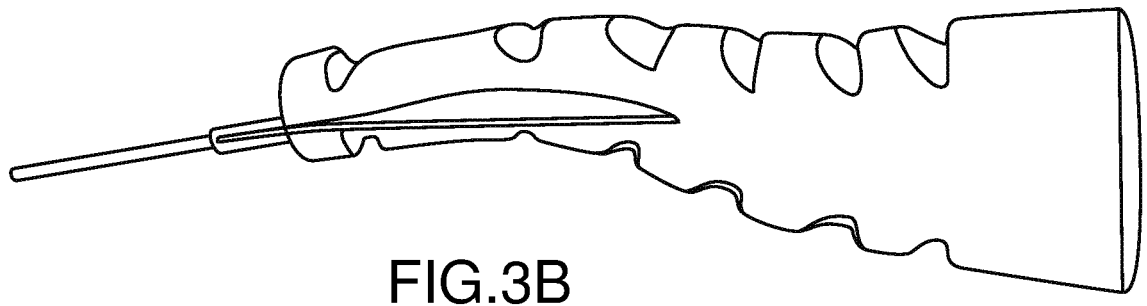

To achieve desired, repeatable flex patterns, skin 114 may be patterned with one or more strain relief sections 118 on each side of tail portion 104, comprising one or more cutouts or changes in skin thickness, whose shape, size, and spacing are chosen to provide a series of pivot points. The larger the size of relief sections 118, the greater flexibility of tail portion 104 can be achieved. These strain relief sections, when combined with the directional-rigidity provided by upper and lower backbones, allow the tail to bend horizontally in a variety of shapes, shown in FIGS. 2A, 2B, 3A and 3B. In FIGS. 2A and 2B, two views of tail section 104 are shown; FIG. 2A showing a top perspective, a first view of tail portion 104 shown maximally flexed in a first anguilliform form and a second view as FIG. 2B, showing tail portion 104 flexed in an opposing anguilliform form, i.e., 180 degrees of an undulation cycle from the first view. Relief sections are shown on each side of tail portion 104, allowing tail portion 104 to more easily flex into an anguilliform form, bending at two locations 200 and 202. Similarly, in FIGS. 3A and 3B, two views of tail section 104 are shown from a top perspective, a first view of tail portion 104 shown maximally flexed in a first carangiform position and a second view showing tail portion 104 flexed in an opposing carangiform form, i.e., 180 degrees of an undulation cycle from the first view. FIGS. 2A, 2B, 3A and 3B show the five relief sections on each side of tail portion 104. In one embodiment, one or more actuators can be used to lock and unlock certain strain relief sections via computer control.

In one embodiment, BIV 100 comprises one or more fixed or detachable handles or handlebars (not shown) in order for a person to use BIV 100 as an untethered dive scooter. In this embodiment, controls may be provided on the handles or handlebars to control the speed and depth of BIV 100.

Tail portion 104 may comprise one or more upper and lower dorsal fins 122, to provide rotational stability to BIV 100.

Figure 4:
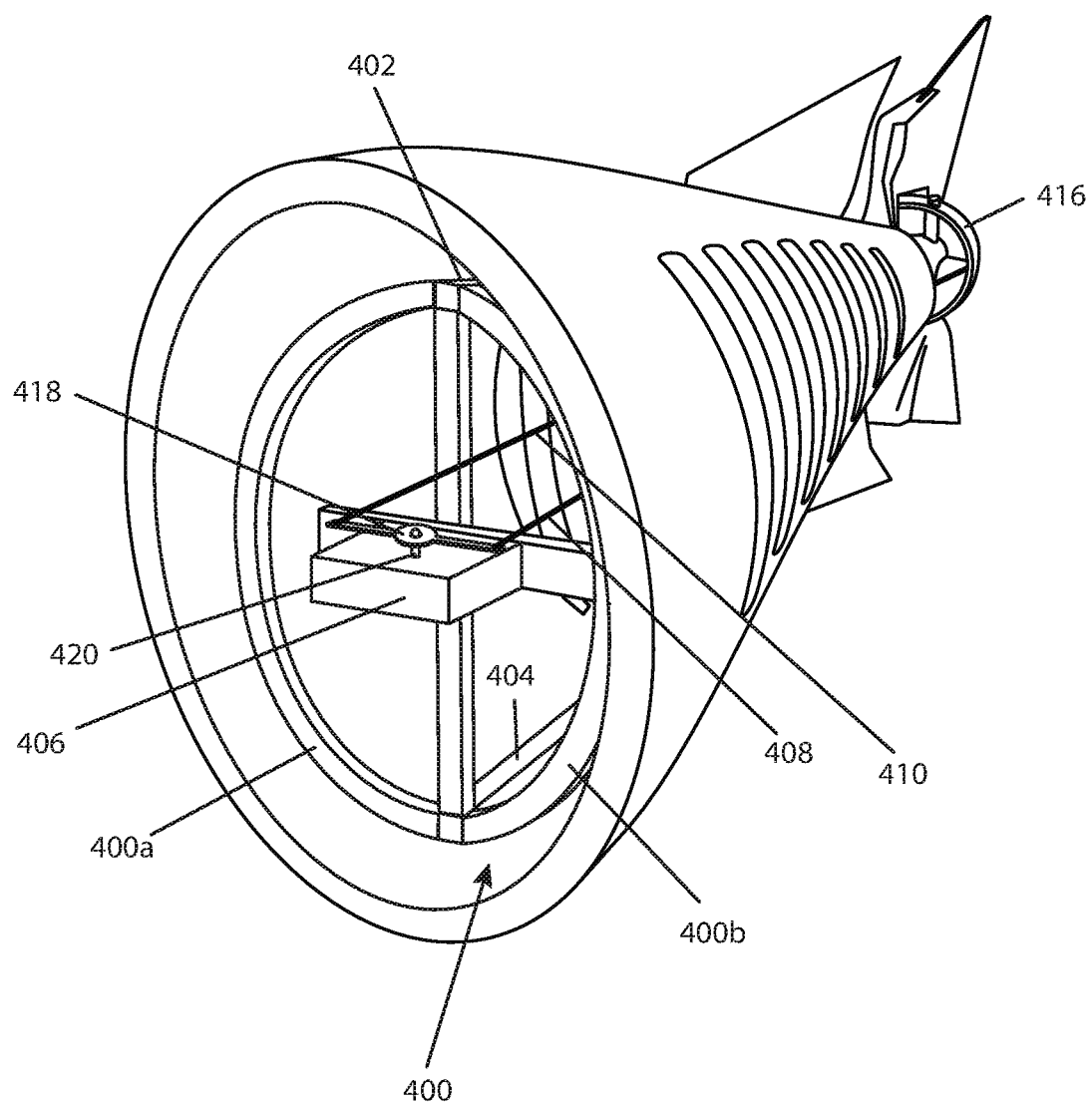
FIG. 4 is a perspective view of the tail portion as shown in FIGS. 1-3.
Figure 5:
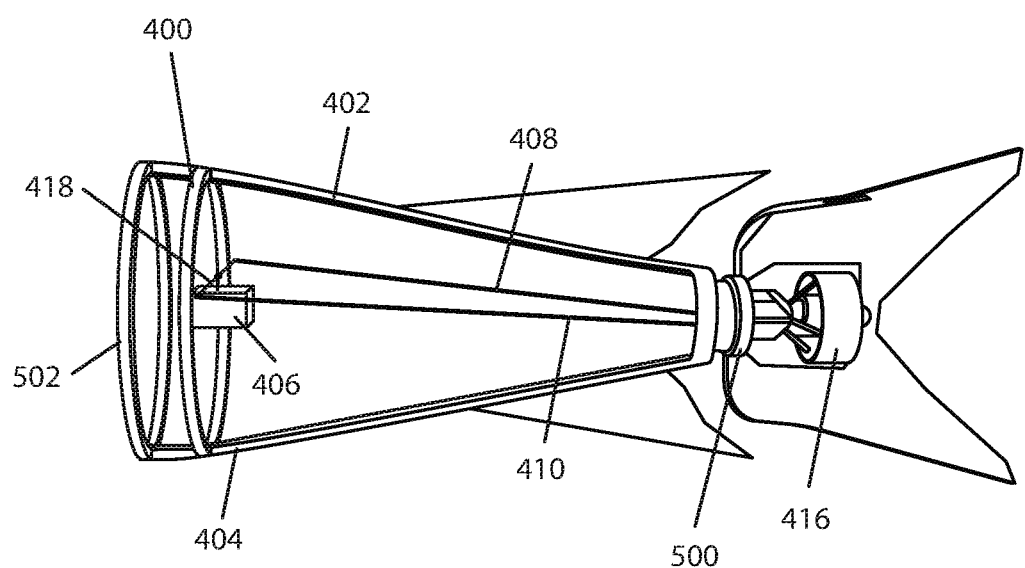
FIG. 5 is a side, cutaway view of the tail portion of FIGS. 1-4.

FIG. 4 is a perspective view of one embodiment of tail portion 104, while FIG. 5 is a side, cutaway view of the same embodiment of tail portion 104, without skin 114. In this embodiment, tail portion 104 comprises a mounting bracket 400 comprising left bracket 400a and right bracket 400b, an upper backbone 402, a lower backbone 404, an actuator 406, a left linkage 408, a right linkage 410, and a semi-rigid polymeric membrane or skin 114 and thruster 116.

In this embodiment, left mounting bracket 400a is held to right mounting bracket 400b via upper backbone 402 and lower backbone 404, which extend longitudinally and perpendicularly from bracket 400. Upper backbone 402 and lower backbone 404 are joined together at a rear baseplate 500 near thruster 116. This forms the basic structure of tail portion 104. In other embodiments, mounting bracket 400 comprises a unitary structure, with upper backbone 402 and lower backbone 404 secured thereto using conventional mounting techniques such as bolting or riveting. Mounting bracket 400 comprises a perimeter in the shape of an oval having a major diameter positioned towards upper backbone 402 and lower backbone 404, with a minor diameter positioned laterally. In other embodiments, the perimeter may form different geometric shapes, such as a circle, a triangle a square, or some other shape. The major and minor diameter of the oval defines the overall size of BIV 100, with upper backbone 402 and lower backbone 404 each having a length in proportion to the major and/or minor diameters. For example, in the embodiment shown in FIGS. 4 and 5, the length of each backbone is approximately three times the major diameter of mounting bracket 400.

In one embodiment, as shown in FIG. 5, a mating bracket 502 is coupled to upper backbone 402 and lower backbone 404 in which head portion 102 may be installed.

Upper backbone 402 and lower backbone 404 are typically rotationally offset relative to a plane of oscillation of tail portion 104. For example, FIGS. 4 and 5 display one representation of this feature where the backbones are offset by +/−90 degrees relative to the plane of tail oscillation. The material, length and shape of the backbones are selected to provide both structural rigidity (perpendicular to the plane of tail oscillation) and flexibility (in the plane of oscillation). As such, the backbones are manufactured from hard rubber, plastic, fiberglass, or the like. In FIGS. 4 and 5, these requirements are met by making the cross-sectional of width of tail section 104 thinner than the cross-sectional height. Similar results can be achieved with or without the difference in cross-sectional height and width by employing composite materials, for example.

Skin 114, which covers the backbones and, in other embodiments, ribs, defines an external shape of tail portion 104 and provides a cavity in which actuator 406 is housed. Skin 114 comprises a semi-rigid material, sturdy enough to allow tail portion 104 to maintain its shape while BIV 100 is out of the water, while still being elastic enough to allow and withstand constant flexures caused by movement of tail portion 104 during locomotion. Generally, the selected material additionally comprises a restoring characteristic such that when tail portion 104 is bent, the material naturally tends to resist such bending and restore tail portion 104 to its original, straight alignment. In one embodiment, skin 114 may simply comprise a standard traffic cone, or common material used to construct such traffic cones, such as thermoplastics, PVC, silicone, neoprene or rubber. In embodiments where ribs are used in addition to the backbones, skin 114 may comprise a relatively thin membrane, such as on the order of 1-5 millimeters or so. In yet another embodiment, skin 114 comprises a removable "wetsuit" that is sized and shaped to be installed over tail portion 104, or the entire BIV 100. The wetsuit may comprise neoprene, or other similar material, and its thickness may be selected based on the environment in which BIV 100 will be deployed. For example, in very cold water, additional buoyancy may be required via a thicker wetsuit to achieve a neutral buoyancy that would otherwise be required in warmer waters, which may require a thinner wetsuit. The wetsuit may be constructed in sections, each comprising one or more fasteners such as zippers, clasps, buttons, Velcro® or the like, so that the wetsuit may be easily placed and secured around BIV 100, head section 102 and/or tail section 104.

In one embodiment, skin 114 may comprise an inner surface comprising a first material, and an exterior surface comprising a different material. The first material may be selected based on flexibility, while the different material forming the exterior surface may be chosen for hydrodynamic properties, i.e., its hydrodynamic resistance and for durability.

In one embodiment, skin 114 may comprise active materials, such as piezoelectric actuators, memory polymers, or Nitinol actuators, to change the stiffness or other mechanical properties of tail portion 104. Such activation may be controlled by an onboard processing device under either autonomous, manual or remote control.

Actuator 406 is secured to mounting bracket 400, in this embodiment, to a cross member that is part of mounting bracket 400 proximate to the center of mounting bracket 400. Actuator 406 is configured to cause tail portion 104 to undulate in anguilliform or carangiform form as a result of energizing actuator 406. In one embodiment, actuator 406 comprises a swing arm 418 coupled to rotor 420 extending from actuator 406. Actuator 406 may comprise one or more electric motors, servomotors, linear actuators, continuous motors outfitted with geared drivetrains, muscle wires, and/or hydraulic motors, selected based on size, power consumption and torque. A close-up, perspective view of actuator 406 is shown in FIG. 6, along with linkages 408 and 410, as explained below.

Figure 6:
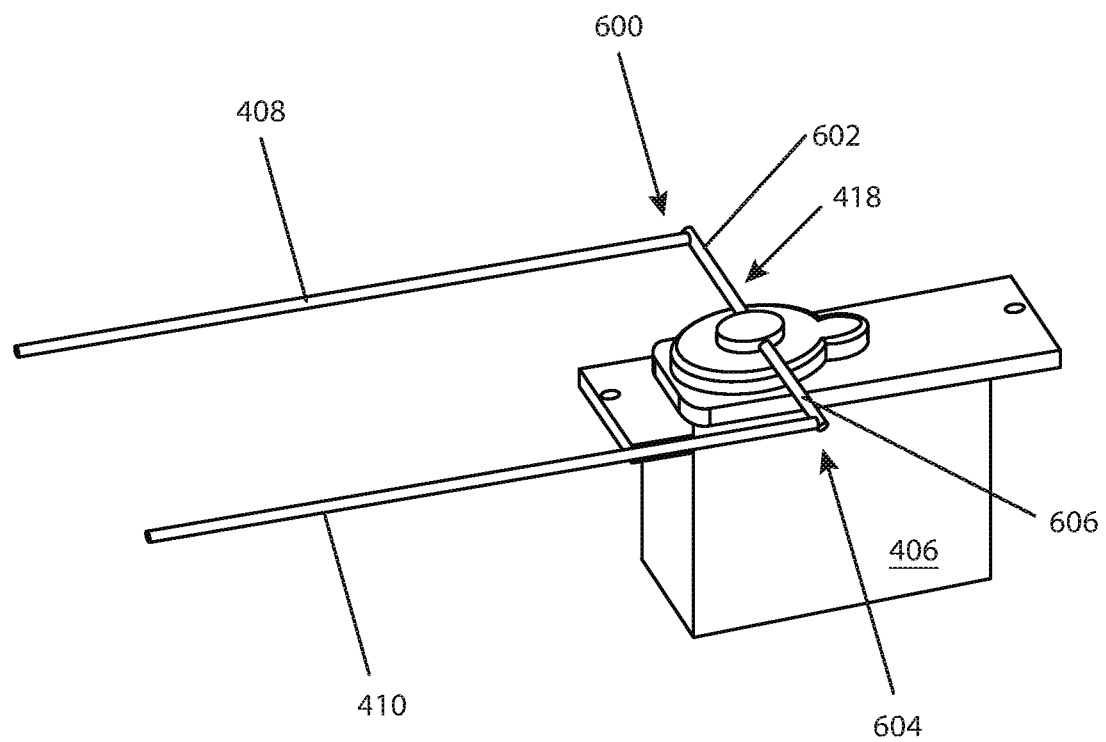
FIG. 6 is a close-up, perspective view of an actuator and associated linkages, as shown in FIGS. 4 and 5.

Referring to FIGS. 4, 5 and 6 left linkage 408 comprises a wire, or some other thin, flexible or rigid structure, having a first end 600 connected to a first portion 602 of arm 418, near one end of arm 418, and a second end connected to baseplate 500 (as shown in FIG. 5) or some other portion of tail portion 104. Right linkage 410 comprises a similar wire, or some other thin, flexible or rigid structure, having a first end 604 connected to a second portion 606 of arm 418, near the other end of arm 418, and a second end connected to baseplate 500 (as shown in FIG. 5) or some other portion of tail portion 104. In some embodiments, the linkages may cross each other at some point along the length of tail portion 104. The lengths of the linkages are chosen such that tail portion 104 is in a neutral position (i.e., straight, or no bend) when neither linkage is under tension, and arm 418 is positioned perpendicularly to longitudinal axis 120 of tail portion 104. Tail undulation is achieved by alternating the tension in each linkage, i.e., causing actuator 406 to rotate clockwise and then counterclockwise which, in turn, causes arm 418 to pull each linkage in turn towards head portion 102. Tail undulation is then controlled by the rotational velocity and arc length of arm 418 as actuator 406 causes arm 418 to alternate tension on the linkages. The undulation of tail portion 104 propels BIV 100 forward much the same as a fish. Turning via tail undulation can be achieved by offsetting the center of the arc (traversed by the swing arm) from center. By coupling the second end of each linkage at the baseplate 500, and/or other connection points along an inner surface of skin 114 as shown in FIGS. 7A and 7B, different swim modes may be achieved.

Figure 7A:
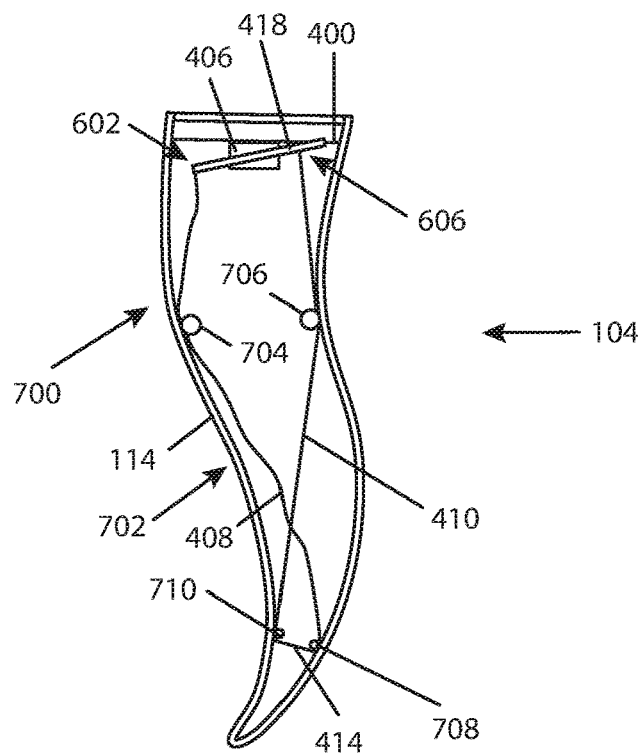
FIGS. 7A and 7B each illustrate a top, cutaway view of the tail portion as shown in FIGS. 3A and 3B, with FIG. 7A illustrating the tail portion flexed in a first, maximum anguilliform position and FIG. 7B illustrating the tail portion flexed in an opposing, maximum anguilliform position.
Figure 7B:
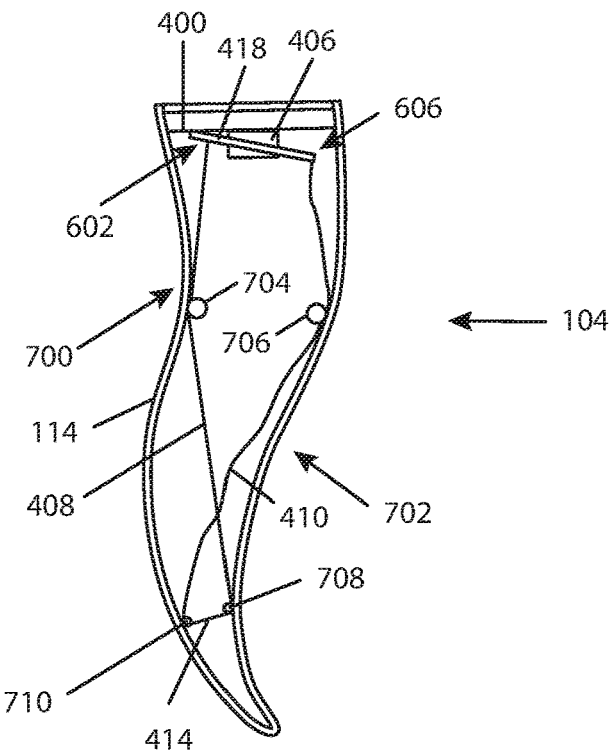

FIGS. 7A and 7B each illustrate a top, cutaway view of tail portion 104, with FIG. 7A illustrating tail portion 104 shown flexed in a first, maximum anguilliform position and FIG. 7B illustrating tail portion 104 flexed in an opposing, maximum anguilliform position, i.e., 180 degrees in an undulation cycle from the view shown in FIG. 7A. In this embodiment, tail portion 104 comprises two bends 700 and 702, bend 700 defined by connection points 704 or 706, and bend 702 defined by the connection of the linkages to baseplate 500 at connection points 708 and 710. The connection points 704, 706, 708 and 710 may comprise one or more eyelets coupled to the inner surface of skin 114 along the each side of tail portion 104. In other embodiments, the eyelets may be coupled to one or more ribs or a flexible frame, as described later herein.

In another embodiment, eyelets are not used. Rather, a pair of slits for each connection point may be cut into skin 114, allowing a linkage to be threaded therethrough.

In another embodiment, each linkage is attached to connection point 704 or 706, respectively, and another pair of linkages is attached to connection point 704 or 706, respectively, and then attached to connection points 708 and 710, respectively, or to baseplate 500 (alternative, a single linkage may be tied to, or otherwise attached, to a connection point at some point along its length, with the remaining portion attached to connection points 708 and 710 or baseplate 500). In other words, rather than being threaded through the connection points and free to slide therethrough as arm 418 rotates, the linkages are attached to each connection point and then continue to connection points 708 and 710 or to baseplate 500. In this embodiment, when a respective linkage is pulled by arm 418, a respective connection point is pulled toward actuator 406, which in turn causes the remaining portion of the linkage, i.e., the one connecting a respective connection point 708 or 710, to be pulled toward actuator 406 as well.

Each linkage shown in FIG. 7 is attached to a respective portion of arm 418 at one end, i.e., left linkage 408 coupled to arm end 602 and right linkage 410 coupled to arm end 606, while the other end of each linkage is threaded through a respective connection point, then attached to connection points 708 and 710, respectively, located on or near baseplate 500. In this manner, when arm 418 is rotated as shown in FIG. 7A by actuator 406, right linkage 410 becomes taught, bending tail portion 104 at connection point 706, as well as near connection point 710. In this portion, left linkage 408 is slack. As actuator 406 rotates clockwise, through a horizontal position, tail portion 104 generally becomes straight, as a result of the restoring nature of skin 114. In this position, both linkages generally are neither in tension nor slack. As actuator 406 continues to rotate clockwise, it reaches its maximum deflection point, as shown in FIG. 7B, where left linkage 408 becomes taught, bending tail portion 104 at connection point 704, as well as connection point 708 on or near baseplate 500, while right linkage 410 is slack. During propulsion, actuator 406 continues to rotate back and forth between the maximum clockwise position and the minimum clockwise position, causing tail portion 104 to undulate in the anguilliform swimming mode.

Figure 8A:
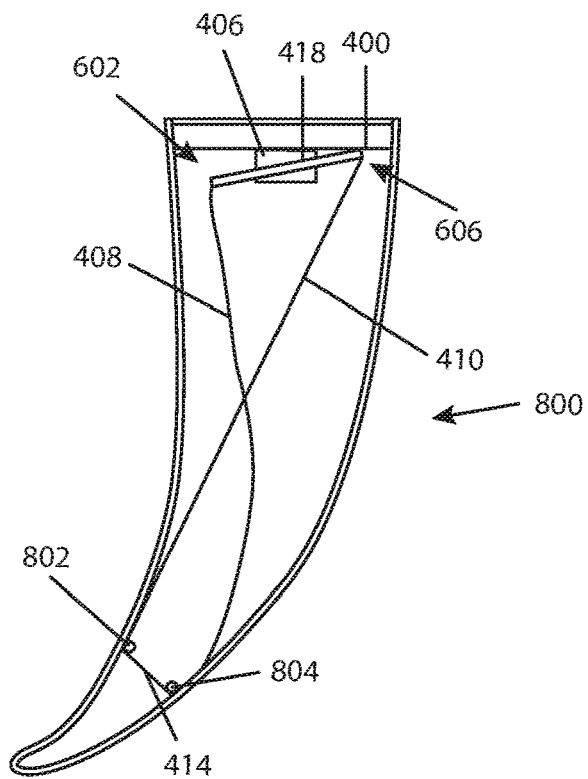
FIGS. 8A and 8B each illustrate a top, cutaway view of the tail portion as shown in FIGS. 2A and 2B, with FIG. 8A illustrating the tail portion flexed in a first, maximum carangiform position and FIG. 8B illustrating tail portion flexed in an opposing, maximum carangiform position.
Figure 8B:
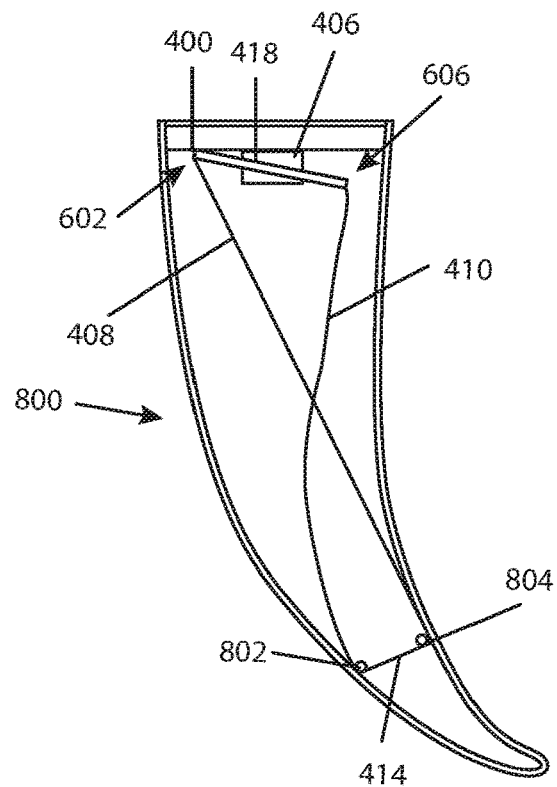

FIGS. 8A and 8B each illustrate a top, cutaway view of tail portion 104, with FIG. 8A illustrating tail portion 104 shown flexed in a first, maximum carangiform position and FIG. 8B illustrating tail portion 104 flexed in an opposing, maximum carangiform position, i.e., 180 degrees in an undulation cycle from the view shown in FIG. 8A. In this embodiment, tail portion 104 comprises one bend 800, formed by tension on linkage 408 or 410 coupled to connection point 802 or 804, respectively, located on or near baseplate 500. While the linkages shown in FIGS. 8A and 8B are crossed, in other embodiments, linkage 408 is coupled to connection point 802 and linkage 410 is coupled to connection point 804. In FIG. 8A, arm 418 is rotated counter-clockwise by actuator 406, causing linkage 410 to be under tension and linkage 408 to become slack, pulling connection point 802 towards actuator 406, thus creating bend 800. In FIG. 8B, arm 418 is rotated clockwise by actuator 406, causing linkage 408 to be under tension and linkage 410 to become slack, pulling connection point 804 towards actuator 406, thus creating bend 800 in an opposing direction from the view shown in FIG. 8A.

In one embodiment, one swim pattern or the other (i.e., anguilliform or carangiform) could be selected during fabrication of BIV 100, in a manner that permanently assigns one swim pattern or the other to BIV 100. In other embodiments, the swim pattern is interchangeable in the field, for example, depending upon mission parameters (speed vs maneuverability) either using simple hand tools to change the connection points of the linkages, or they could be changed during a mission using a servo actuated stop. In this embodiment, each linkage may comprise two or more attachment points, such as small loops formed from each linkage, hooks, or carabiners, where each attachment point is located along a length of a respective linkage to couple to a respective connection point inside skin 114.

Figure 9A:
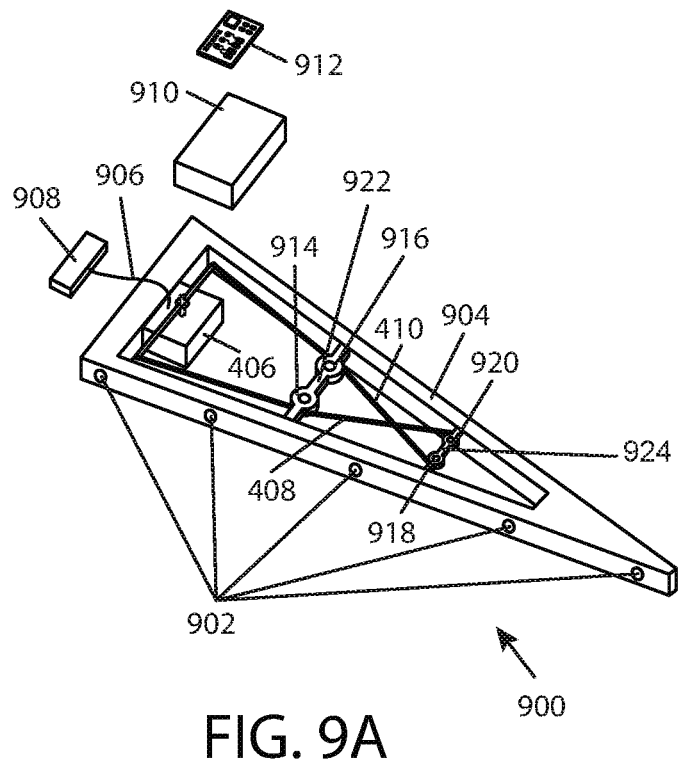
FIG. 9A illustrates one embodiment of a flexible swim cartridge configured for anguilliform propulsion.
Figure 9B:
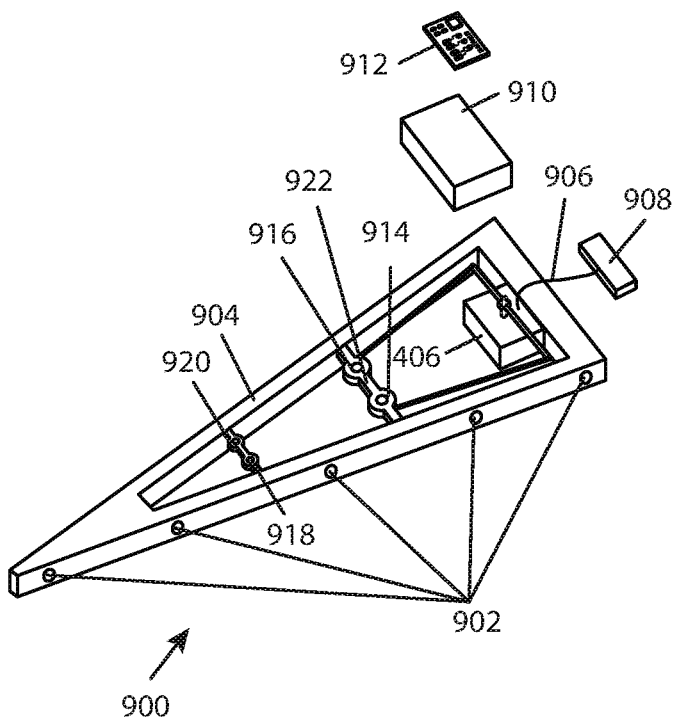
FIG. 9B illustrates one embodiment of the flexible swim cartridge as shown in FIG. 9A, configured for carangiform propulsion.
Figures 16A, 16B, 16C, 16D:
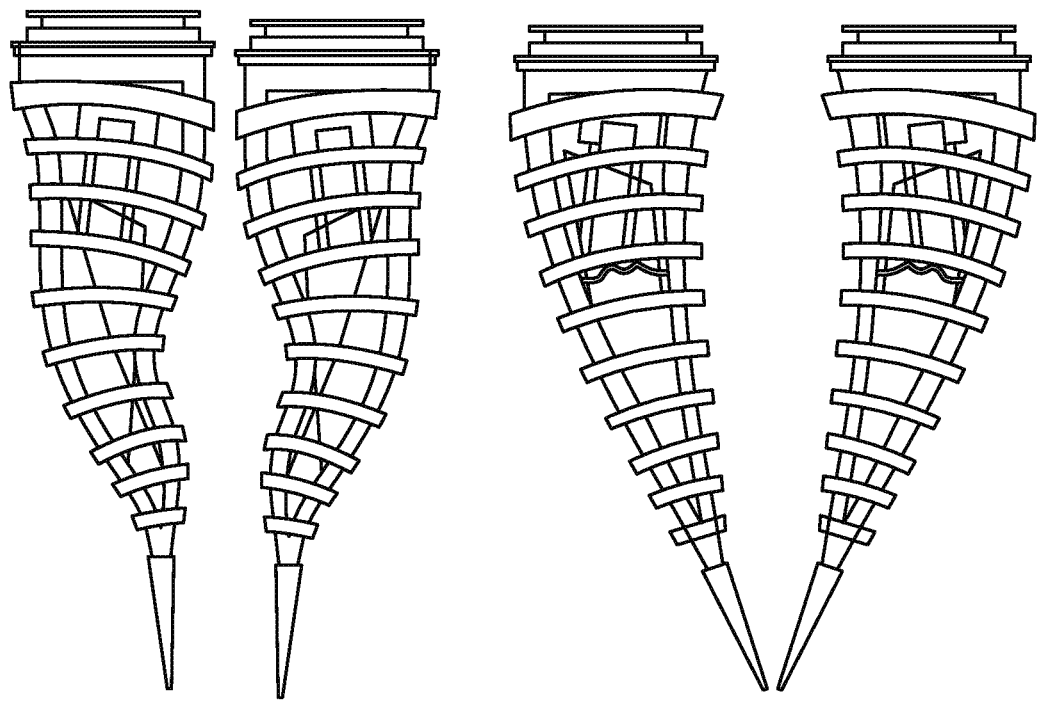
FIGS. 16A and 16B illustrate a top, cutaway view of two positions of the tail portion as shown in FIGS. 3A and 3B, and FIGS. 7A, and 7B, respectively, using the interchangeable swim cartridge as shown in FIG. 9A, resulting in anguilliform movement.
FIGS. 16C and 16D illustrate a top, cutaway view of two positions of the tail portion as shown in FIGS. 2A and 2B, and FIGS. 7A and 7B, respectively, using the interchangeable swim cartridge as shown in FIG. 9A, resulting in carangiform movement.

Interchangeability may be accomplished, in one embodiment, using an interchangeable, flexible swim cartridge 900, as shown in FIGS. 9A and 9B. FIG. 9A illustrates one embodiment of interchangeable swim cartridge 900, configured for anguilliform propulsion, used to quickly adjust swim characteristics of BIV 100, i.e., to change a swim pattern of BIV 100 from carangiform to anguilliform form. Swim cartridge 900 is configured to be quickly and easily installed and removed from inside tail portion 104 via one or more connection points 902 (located on each side of flexible frame 904), which may comprise tabs, buttons, knobs, snaps, or other similar fastening means that connect to corresponding, reciprocal connection points formed onto an inner surface of skin 114 or on an inside portion of ribs, if used. In one embodiment, swim cartridge 900 comprises flexible frame 904, actuator 406, left linkage 408, right linkage 410, wire harness 906, connector 908 and, in some embodiments, power source 910 and power amplifier 912. Flexible frame 904 is semi-rigid, manufactured from plastic, hard rubber, or other semi-rigid material rigid enough to provide structural support for actuator 406 and define a cavity inside tail portion 104, while also allowing bending in a horizontal plane to mimic kinematic movement of an aquatic animal. In the embodiment shown in FIGS. 9A and 9B, flexible frame 904 is shown as an isosceles triangle, however other geometric shapes could be used alternatively. Actuator 406 is mounted to frame 904, and the linkages are secured to arm 418, as previously described. The opposing ends of the linkages are connected to two connection points each: linkage 408 connected to connection points 914 and 920, and linkage 410 connected to connection points 916 and 918, in an embodiment where flexible cartridge 900 is configured to provide anguilliform propulsion to BIV 100. Connection points 914 and 916 are shown located on optional cross-member 922, while connection points 918 and 920 are shown as located on cross-member 924. The cross-members may be used to maintain structural integrity of frame 904, in embodiments where frame 904 is constructed of materials that allow frame 904 to flex very easily. FIGS. 16A and 16B illustrate a top, cutaway view of two positions of tail portion 104, where tail portion 104 comprises swim cartridge 900 as shown in FIG. 9A, resulting in anguilliform movement of tail portion 104.

Connection points 914 and 916, in this embodiment, each comprise a smooth, rounded surface that provides a low-friction surface over which a respective linkage may slide while under tension which, in turn, causes tail portion 104 to bend near connection point 914 and 916. Connection points 918 and 920 are also shown having rounded surfaces, but need not, since the linkages are typically terminated at these points and do not slide past each connection point.

FIG. 9B illustrates the interchangeable, flexible swim cartridge of FIG. 9A, configured for carangiform propulsion, slightly different than the embodiment shown in FIGS. 8A and 8B, as the linkages are connected to the connection points 914 and 916 much closer to actuator 406. However, similar to FIGS. 8A and 8B, the linkages are connected to only one connection point each: one linkage to connection point 914, and the other linkage connected to connection point 916. Frame 904 bends at a point near the connection points as each linkage, in turn, is pulled towards actuator 406 during arm 418 rotations. Connection points 918 and 920 are not used, but may be present in an embodiment where the linkages are interchangeable with longer ones, to resemble the embodiment shown in FIG. 9A. FIGS. 16C and 16D illustrate a top, cutaway view of two positions of tail portion 104, where tail portion 104 comprises swim cartridge 900 as shown in FIG. 9B, resulting in carangiform movement of tail portion 104.

Figure 10:
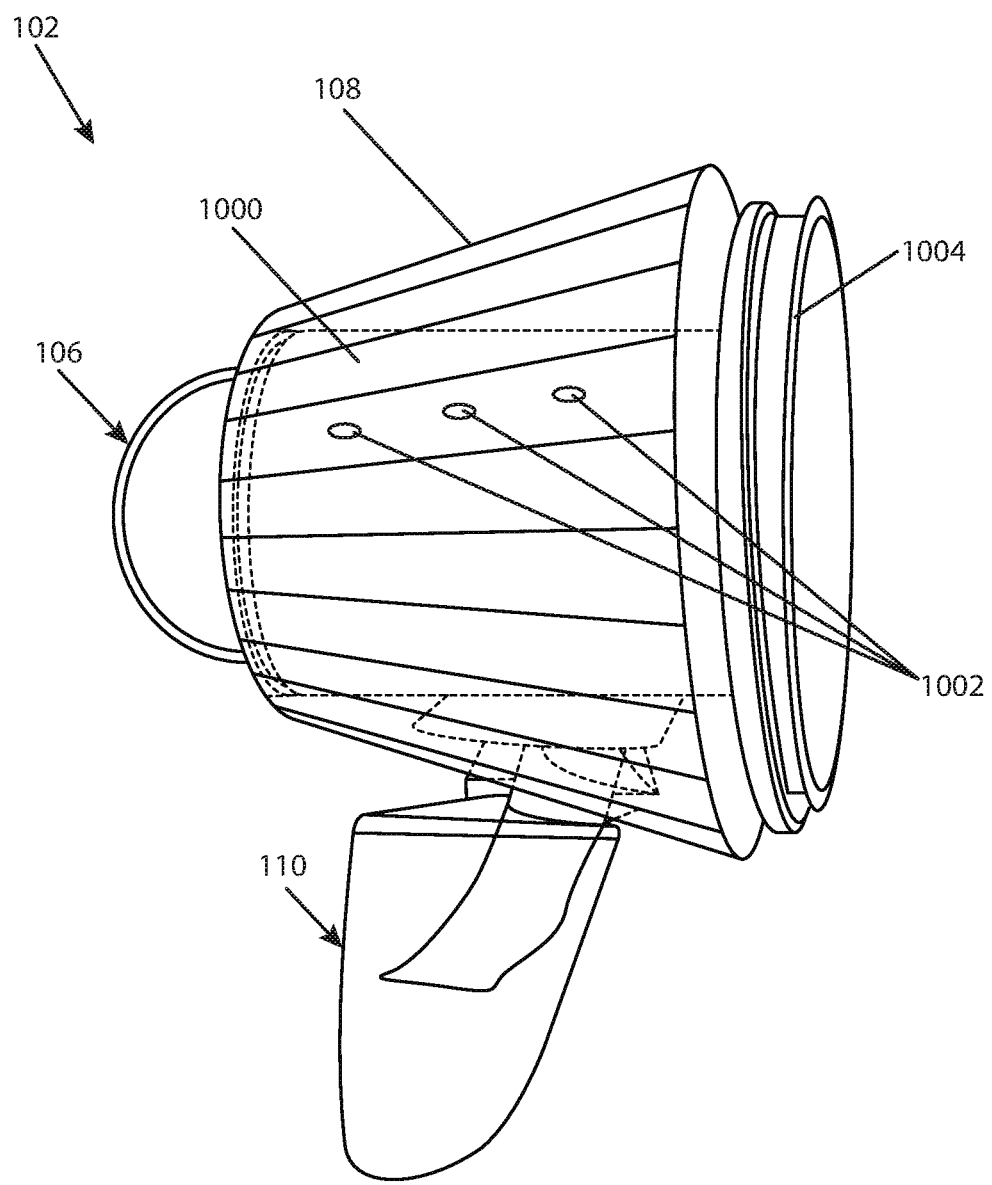
FIG. 10 is a side, semi-cutaway view of one embodiment of a head portion of the modular, biomimetic underwater vehicle as shown in FIG. 1.

FIG. 10 is a side, semi-cutaway view of head portion 102. Head portion 102 provides a housing that forms the external shape of head 102. Head portion 102 is configured to house one or more for subsystems, such as navigation systems, propulsion control systems, buoyancy management, sensors, power management and, in some embodiments, communication systems. In one embodiment, a cylindrical pressure vessel 1000 provides mechanical/impact protection to the subsystems and, further, may additionally be sealable, in order to provide a pressurized environment to the subsystems. Cowl 108 is mounted over the pressure vessel and provides a tapered surface over which an outer skin (now shown) may be layered, to reduce hydrodynamic drag. The outer skin may be constructed of the same material as tail portion 104, selected for both aesthetics and hydrodynamics, for example neoprene, and use similar installation techniques, such as the use of a zipper, Velcro, or some other fastening mechanism to secure it around cowl 108. In one embodiment, the outer skin may comprise a plurality of small pockets to fine tune buoyancy.

In one embodiment, the space between pressure vessel 1000 and cowl 108 may be flooded via one or more ports 1002 in order to reduce out-of-water weight by reducing ballast necessary to achieve neutral buoyancy, similar to tail portion 104.

Pressure vessel 1000 and/or cowl 108 may provide mounting points for dive fins 110, which may be rotatable clockwise or counterclockwise via one or more motors located within cowl 108 or pressure vessel 1000 about an axis horizontally perpendicular to the longitudinal axis of BIV 100. BIV 100 ascends when dive fins 110 are rotated upward (i.e., clockwise as seen in FIG. 10) when BIV 100 is being propelled forward by tail portion 104, and descend when dive fins 110 are rotated downward.

Pressure vessel 1000 and/or cowl 108 may additionally provide mounting points for one or more sensors or other electronics, such as one or more cameras, range detectors, pitometers, or lights and, optionally, human interfaces such as handles or handlebars. Domed viewing port 106 is configured to house cameras, sonar equipment, and other navigational and environmental sensors.

Head portion 102 may comprise interface 1004, sized and shaped to mechanically couple to mounting bracket 400 in tail portion 104.

BIV 100 may comprise an ability to flag and record images and sensor data for further analysis in situations where BIV 100 operates autonomously. To prevent large volumes of data from being stored, BIV 100 may only record images and sensor data at a predefined rate. However, to avoid missing any vital data during off-periods, BIV 100 may be configured to recognize a limited set of objects (different species of fish, physical features of ocean floor, barnacles on ship hulls, etc.). If identified, BIV 100 may automatically record images and sensor data at a higher rate and may note the location and time in a log file. This embodiment may be particularly useful to survey damaged or dying coral, or estimating certain fish populations.

Figure 11:
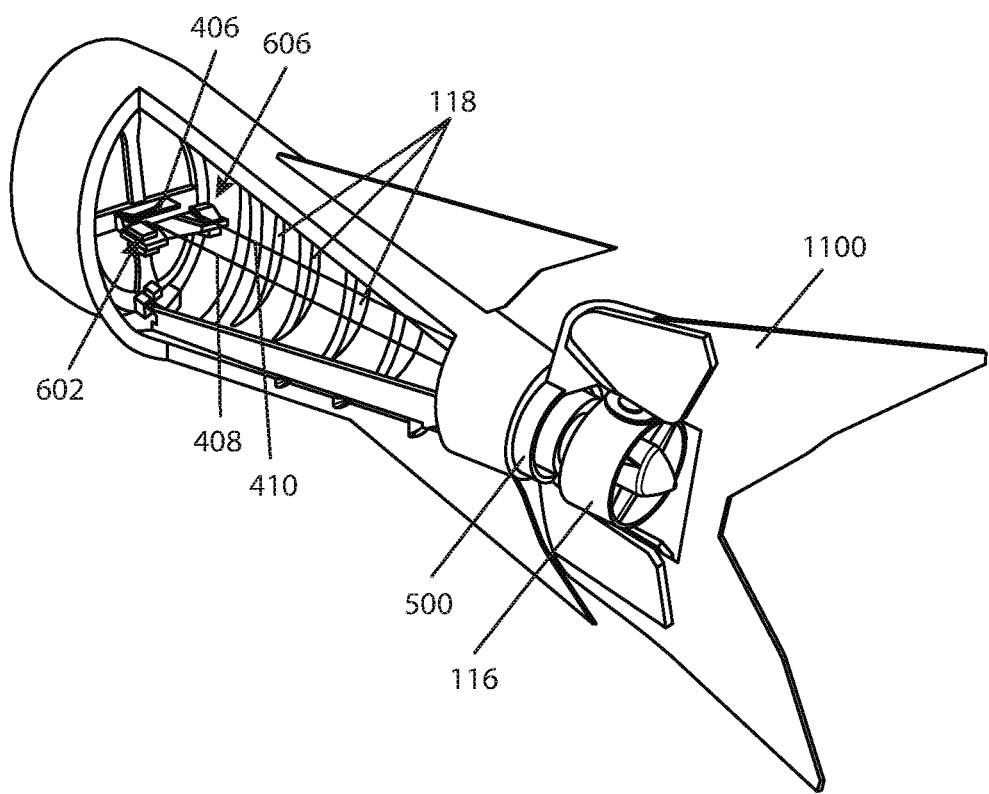
FIG. 11 is a perspective, cutaway view of is a perspective, cutaway view of the modular, biomimetic underwater vehicle as shown in FIGS. 1, 4 and 5, showing some of the components from a different perspective.

FIG. 11 is a perspective, cutaway view of BIV 100 as shown in FIGS. 1, 4 and 5, showing some of the components from a different perspective. Shown in better detail is rudder 1100, which may be used in some embodiments to help steer BIV 100, especially when thruster 116 is used to propel BIV 100. BIV 100 is shown configured for carangiform propulsion, with linkage 408 extending from arm end 602 to a single point inside of skin 114 on or near baseplate 500, and linkage 410 extending from arm end 606 to a single point inside of skin 114 on or near baseplate 500.

Figure 12:
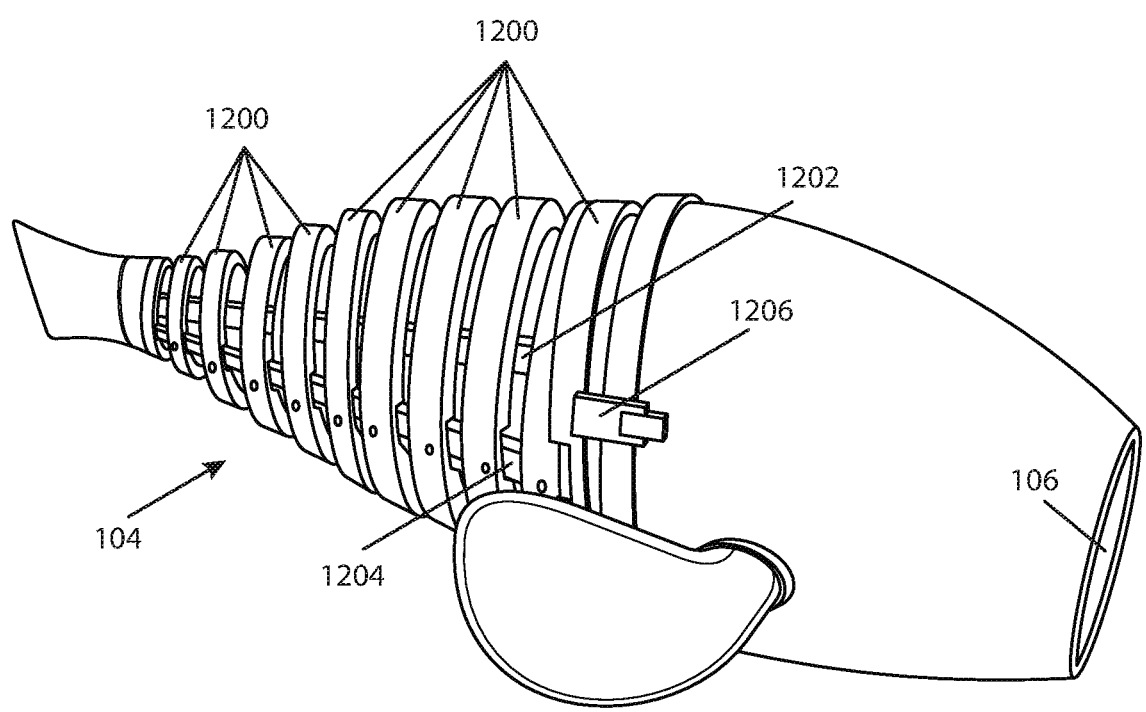
FIG. 12 is a perspective view of another embodiment of the tail portion of FIGS. 1-5, comprising a series of ribs joined a pair of lateral backbones.

FIG. 12 is a perspective view of another embodiment of BIV 100, comprising a series of ribs 1200 spaced apart from one another and joined to port backbone 1202 and starboard backbone 1204 to form a skeleton of tail portion 104. In this embodiment, the backbones are located longitudinally in line with a plane of motion of tail portion 104, the backbones formed of a material similar to backbones 402 and 404 of FIG. 4, allowing the backbones to flex sideways as tail portion 104 is flexed by actuator 406, while maintaining structural integrity of tail portion 104. In one embodiment, backbones 402 and 404 are longitudinal structural members of flexible frame 904, as shown in FIGS. 9A and 9B. In this embodiment, the linkages shown in previous embodiments may be connected to one or more of the ribs, or along flexible frame 904, in order to achieve a desired swim pattern, rather than to an inner surface of skin 114. The ribs 1200 may additionally provide additional structural support to the skin 114.

FIG. 12 also illustrates the modularity BIV 100, where head portion 102 and tail portion 104 may each be interchangeable with other heads or tails comprising different operating characteristics. In one embodiment, head portion 102 and tail portion 104 each comprise a commonly sized and shaped interface, such as the size and shape of interface 1004 or mounting bracket 400, which allow them to be joined at the interface and held together by one or more fastening devices 1206, such as one or more clamps, screws, bolts, or other well-known, temporary joining technique. The length, shape and surface material selection of head portion 104 shown in FIG. 12 may be optimized for a particular operating characteristics, such as low hydrodynamic resistance comprising a single sensor, such as a camera located within viewing port 106. However, head portion 102 is easily removable and another head portion could be coupled to tail portion 102 having a different shape, size, surface material, and/or sensor payload in order to achieve a different operating characteristic than head portion 102. Similarly, another tail could be attached to head portion 102 having a different shape, size, surface material, swim pattern, battery, operating time, and/or some other, different operating characteristics than tail portion 104.

Figure 13:
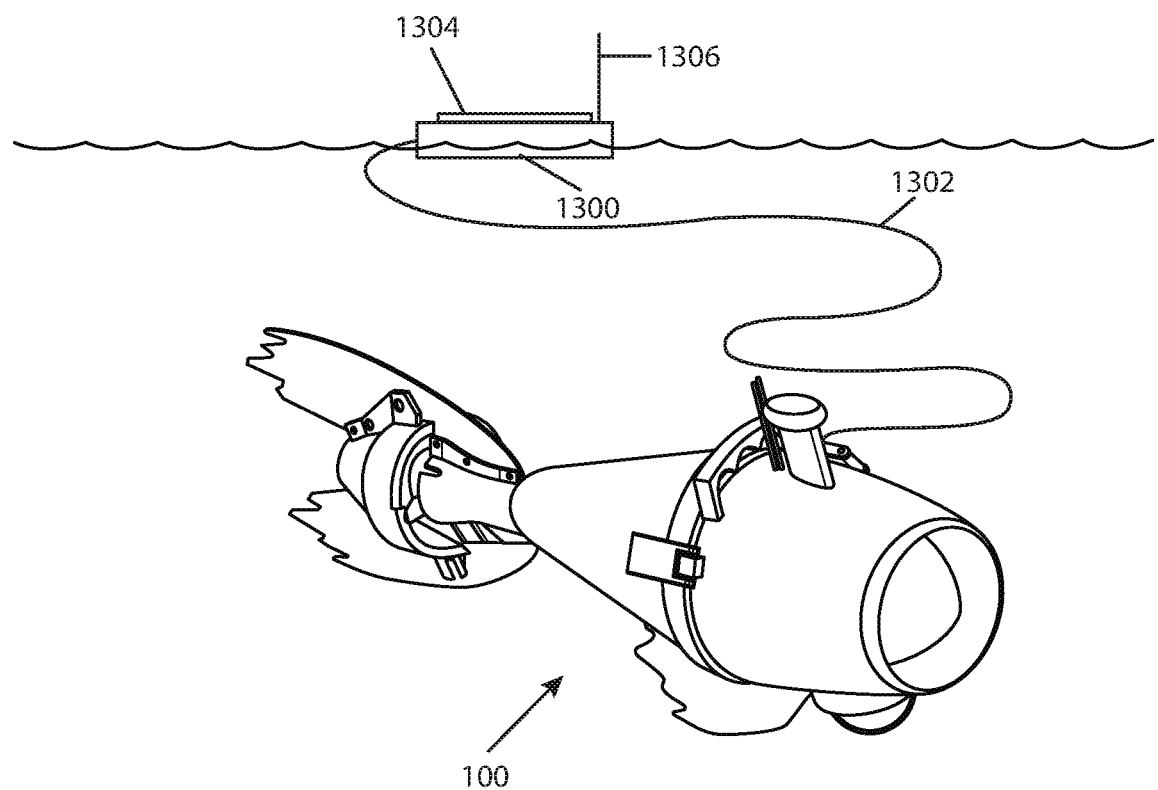
FIG. 13 illustrates an embodiment where the modular, biomimetic underwater vehicle of FIG. 1 receives power communications to or from a remote location via a floating platform.

FIG. 13 illustrates an embodiment where BIV 100 receives power, or one or two-way communications to/from a remote operator. In this embodiment, floating platform 1300 is configured to float on a water's surface, and tethered or connected to BIV 100 via one or more insulated wires 1302, or an insulated wire bundle, to electronics inside BIV 100. In one embodiment, floating platform 1300 comprises a solar array 1304 for producing electric power for consumption by BIV 100. Such power generation can allow BIV 100 to operate for long durations when the sun is shining. In one embodiment, BIV 100 comprises a battery and electronics necessary to charge the battery using power from floating platform 1300. During daylight hours, the batteries generally stay fully charged while the actuator(s)/thruster propels BIV 100 underwater. Solar array 1304 and the battery may be chosen to store enough charge such that the actuator(s) are capable of propelling BIV 100 at least partially through the night. The size of floating platform 1300 may be proportional to the power requirements of BIV 100, which generally increases proportionally with increased BIV size and capabilities, and may be shaped in the form of a circle, square, rectangle, or some other geometric shape. For example, a square solar array of fifteen square feet may product three hundred watts of power, enough to power BIV 100 in an embodiment where BIV 100 is three feet long, possesses a top speed of three knots, and comprises three sensors or less.

Floating platform 1300 may alternatively, or in addition, comprise one or more antennas 1306, used in conjunction with one or more amplifiers onboard floating platform 1300, coupled via the one or more insulated wires 1302 to a receiver or transceiver located onboard BIV 100. Antenna(s) 1306 may receive wireless instructions and/or status requests from a remote operator, such as a land-based transmitter (i.e., cellular tower), water-based (i.e., a buoy or vessel), or a satellite. Such commands may comprise "swim", "swim at speed X", "turn right", "turn left", "dive", "surface", "turn camera on", "point camera in a certain direction", "turn lights on/off", etc. The status requests could comprise requests to send accumulated or real-time data. In this regard, BIV 100 may access stored data, or begin to send real-time data to the antenna(s) 1306, where the data is wirelessly transmitted to the remote operator. BIV 100 may also be configured to autonomously transmit certain signals, such as a low-power signal when BIV 100 determines that its stored power is less than a predetermined value, when an amount of memory storage exceeds a predetermined value, during a failure of one or more sub-systems, etc.

Figure 14:
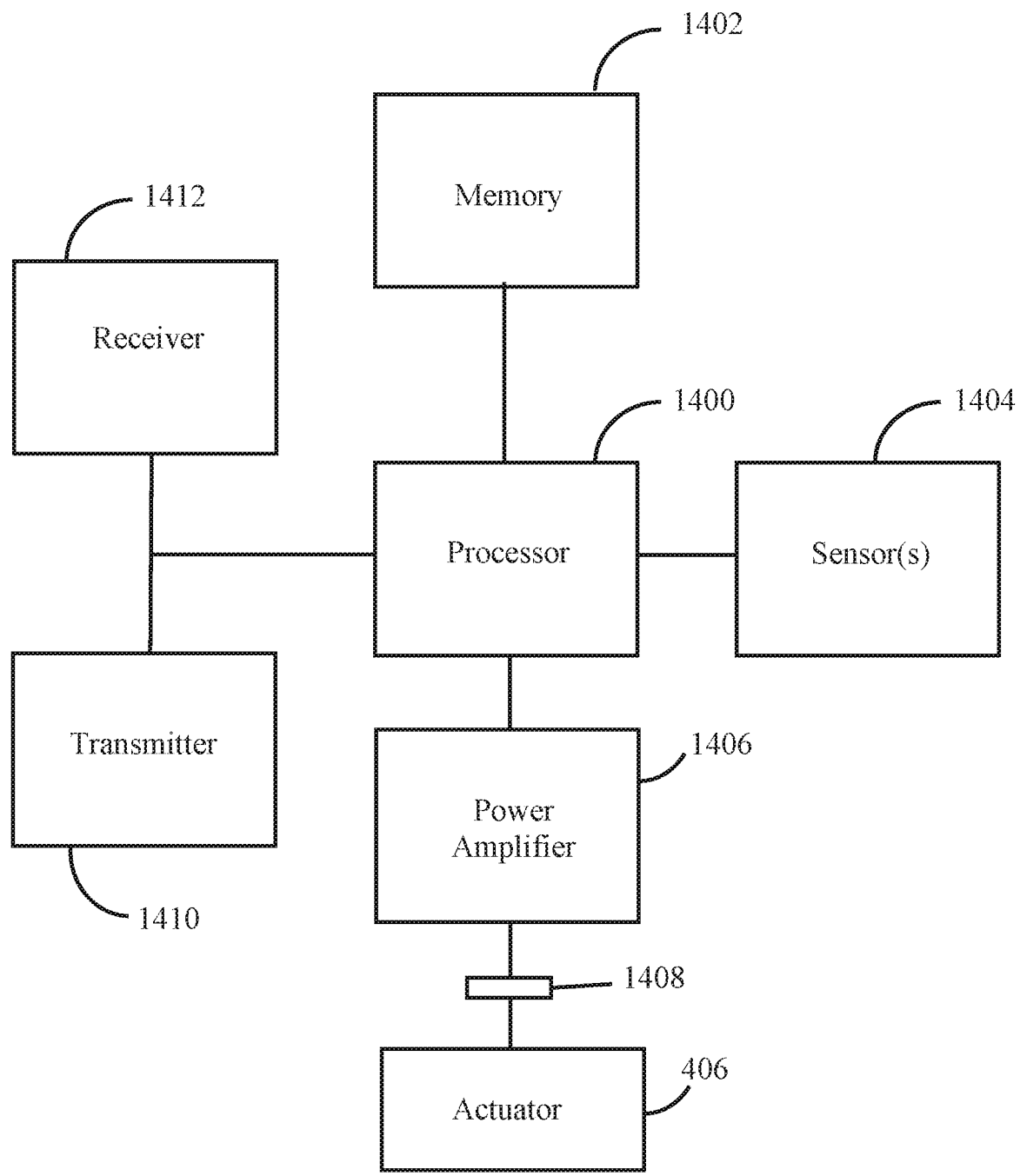
FIG. 14 is a functional block diagram of one embodiment of the modular, biomimetic underwater vehicle as shown in FIG. 1.

FIG. 14 is a functional block diagram of one embodiment of BIV 100, comprising processor 1400, memory 1402, sensor(s) 1404, optional power amplifier 1406, connector 1408, optional transmitter 1410, and optional receiver 1412. Also shown is actuator 406 coupled to power amplifier 1406 via connector 1408. It should be understood that the functional blocks shown in FIG. 1400 may be connected to one another in a variety of ways, and that not all functional blocks necessary for operation of the user control device are shown for purposes of clarity.

In some embodiments, all of the functional blocks are located within head portion 102, with connector 1408 providing actuator signals to actuator 406 during propulsion. However, in other embodiments, some or all of the functional blocks may be located within tail portion 104, depending on space and ballast limitations of tail portion 104.

Processor 1400 is configured to provide general operation of BIV 100 by executing processor-executable instructions stored in memory 1402, for example, executable code. Processor 1400 comprises one or more general or special-purpose microprocessors or microcontrollers, such as any one of a number of Core i-series class microprocessors manufactured by Intel Corporation of Santa Clara, Calif., chosen based on implementation requirements such as power, speed, size and cost.

Memory 1402 comprises one or more information storage devices, such as RAM, ROM, EEPROM, flash memory, SD memory, XD memory, or virtually any other type of information storage device. Memory 1402 is used to store the processor-executable instructions for operation of BIV 100 as well as any information used by processor 1400 to perform such operations. Such information may comprise navigation instructions, communication instructions, propulsion instructions, mission information such as a route of travel, speed, depth and other mission attributes necessary in an autonomous mode, sensor data such as digital video or photographs, pressure readings, and so on. In some embodiments, memory 1402 is incorporated into processor 1400, such as the case in embodiments where processor 1400 comprises a microcontroller or custom ASIC.

Sensor(s) 1404 comprise one or more of a digital camera, a pressure sensor, sonar equipment, water analysis equipment, navigation equipment, (such as a gyro or electronic compass), a pitometer, or other equipment useful in underwater scientific, research, exploration or industrial applications.

In one embodiment, BIV 100 comprises transmitter 1410, comprising circuitry necessary for processor 1400 to provide status and information signals to floating platform 1300, typically via one or more insulated wires 1302. Transmitter 1410 may simply provide raw status and information to floating platform 1300, in an embodiment where floating platform 1300 comprises circuitry necessary to encode, upconvert, modulate, amplify and wirelessly transmit the raw status and information. In other embodiments, transmitter 1410 may comprise some or all of this circuitry such that floating platform need only comprise one or more antennas and/or a power amplifier. The circuitry for wirelessly transmitting signals is well-known in the art, comprising technologies such as satellite, RF, WiFi, cellular, or some other short, medium or long-range transmission technology. The circuitry for providing signals from transmitter 1410 to floating platform 1300 is also well-known in the art, comprising analog or digital technologies, such as Ethernet or analog amplification technologies.

In one embodiment, BIV 100 comprises receiver 1412, comprising circuitry necessary for processor 1400 to receive command and information signals from a remote location, such as a ship, satellite, or land-based transmitter. Receiver 1412 is used in embodiments where remote control of BIV is desirable. For wireless communications, receiver 1412 is coupled to floating platform 1300, typically via the one or more insulated wires 1302, where wireless signals may be amplified, downconverted, demodulated, and decoded by circuitry within floating platform 1300. Baseband signals are then provided to receiver 1412, which then provides commands and information to processor 1400. In another embodiment, receiver 1412 comprises some or all of this circuitry such that floating platform need only comprise one or more antennas and potentially a power amplifier to amplify wireless signals before providing them to receiver 1412 via the one or more insulated wires 1302. The circuitry for wirelessly receiving signals is well-known in the art, comprising technologies such as satellite, RF, WiFi, cellular, or some other short, medium or long-range transmission technology, while the circuitry for providing signals from floating platform 1300 to receiver 1412 is also well-known in the art, comprising analog or digital technologies, such as Ethernet or analog amplification technologies.

Any of the above-described functional blocks may be implemented in hardware that is waterproof, so that they may operate in applications where water is allowed inside BIV 100, for example, for ballast purposes. Various "potting" techniques may be used, for example. Some of the functional blocks may be configured to be quickly and easily interchangeable, so that performance characteristics of BIV 100 can be quickly changed in the field. For example, actuator 406 could be held in place with a clamp or screws and comprise a wire harness and a connector to receive propulsion signals from processor 1400 or power amplifier 1406. Transmitter 1410 or receiver 1412 could likewise be mechanically held in place be quick-removal hardware such as clamps or screws and likewise comprise a wire harness and one or more connectors to interface with the one or more insulated wires 1302 and processor 1400 (for example, via a motherboard connector). It should be understood that in some embodiments, the functionality of transmitter 1410 and receiver 1412 could be implemented as a single transceiver unit.

In one embodiment, receiver 1412 may be configured to receive local command and control signals, for example from a controller or computer operated by a vessel tethered to BIV 100, such as a communication cable similar to the one or more insulated wires 1302 as shown in FIG. 13.

Figure 15A:
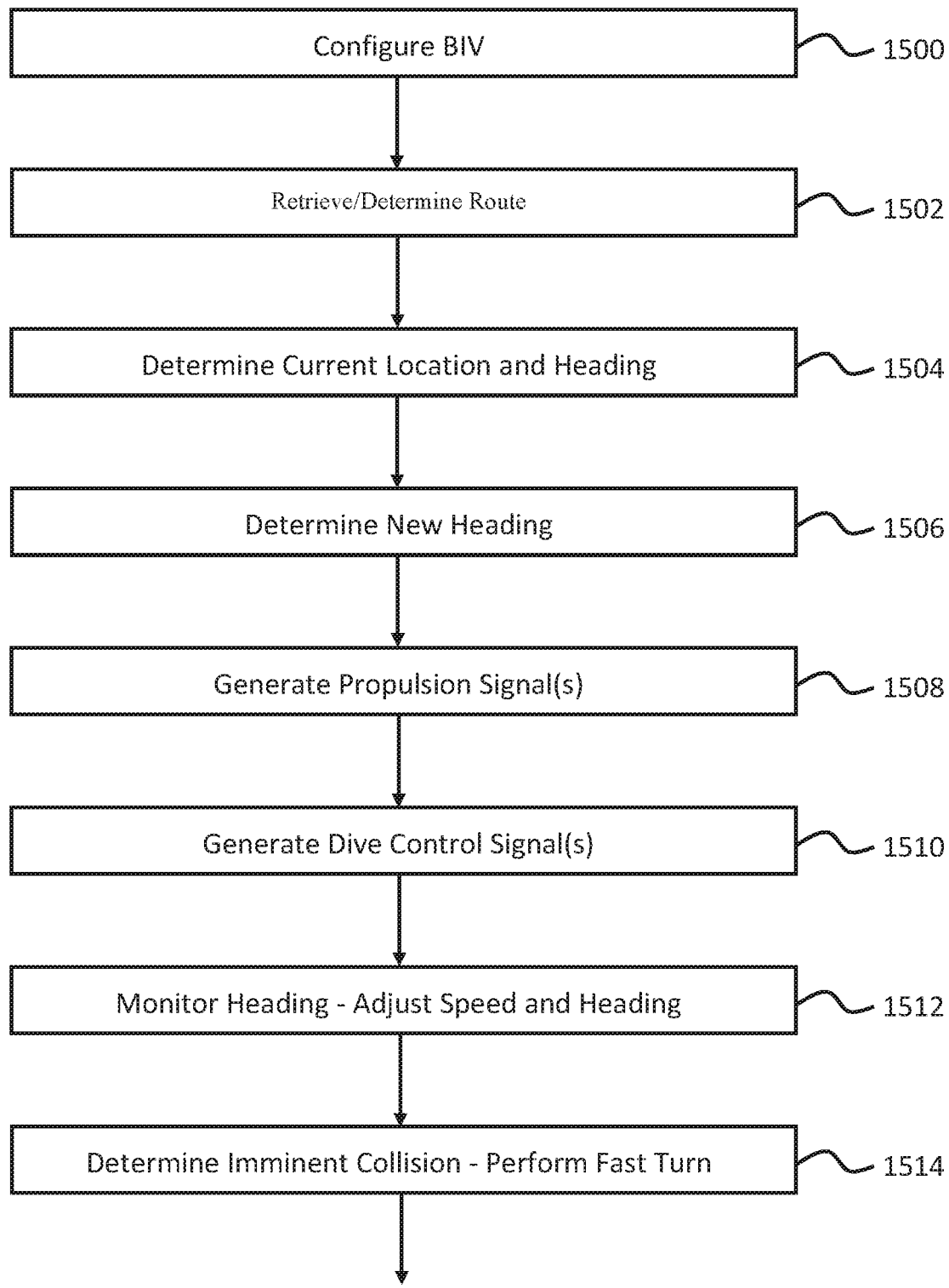
FIG. 15 is a flow diagram illustrating one embodiment of a method executed by the modular, biomimetic underwater vehicle as shown in FIG. 1 in autonomous or remote control operation.
Figure 15B:
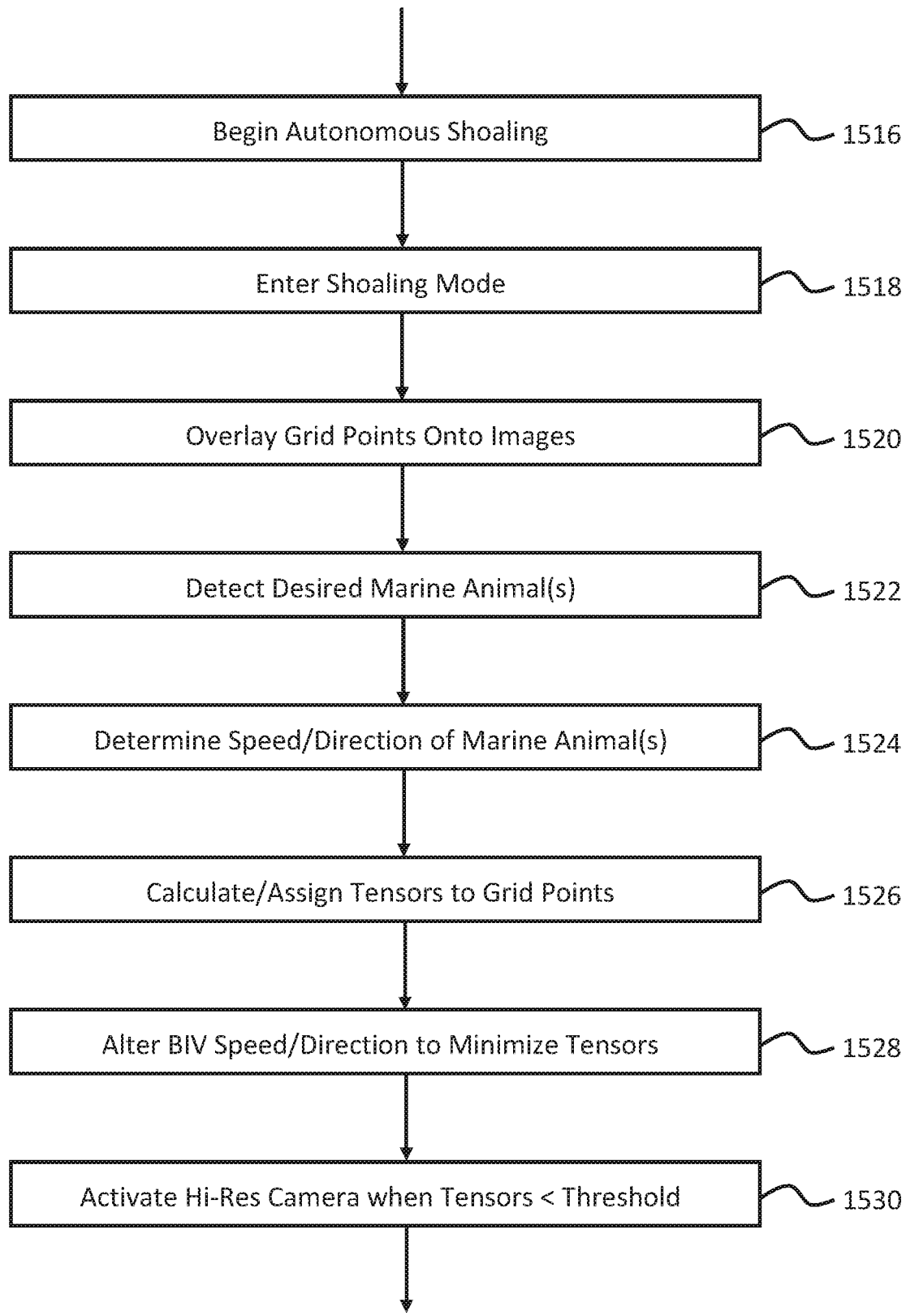
Figure 15C:
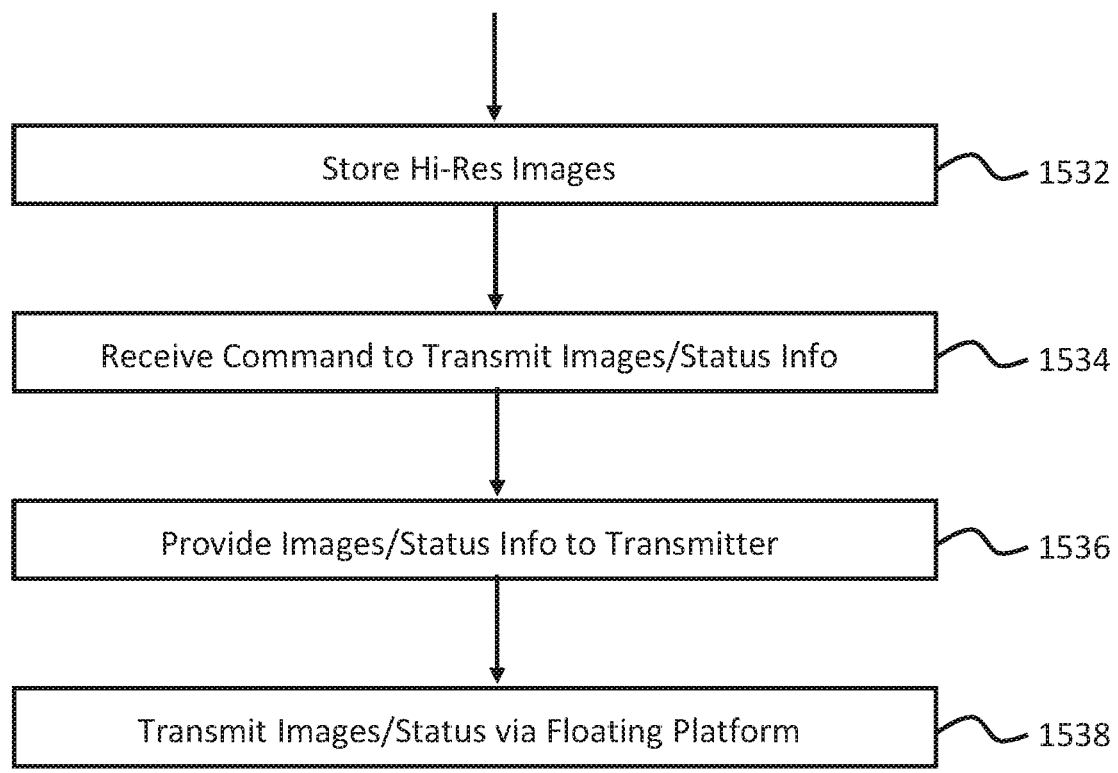

FIG. 15 is a flow diagram illustrating one embodiment of a method executed by BIV 100 in autonomous or remote control operation in an aquatic environment. It should be understood that the steps described in this method could be performed in an order other than what is shown and discussed, and that minor steps have been omitted for clarity.

At block 1500, BIV 100 is outfitted with desired modular elements, such as a charged battery, actuator 406, sensor(s) 1404, transmitter 1410 and receiver 1412, and BIV 100 may further be outfitted with a "wetsuit" in order to obtain neutral or other desired buoyancy. Left linkage 408 and right linkage 410 are connected to one or more connection points on an inside surface of skin 114 of tail portion 104. In one embodiment, flexible cartridge 900 is inserted into tail section 104, configured for a particular propulsion mode. BIV 100 is then placed into an aquatic environment, such as the ocean or a lake.

At block 1502, in an embodiment where BIV 100 is autonomous, processor 1400 retrieves route instructions pre-stored in memory 1402. In other autonomous embodiments, route information is not provided. Rather, instructions are pre-stored in memory 1402 that instructs BIV 100 to perform one or more particular actions, such as to "find a school of fish", or "find a whale", or "skim the bottom for 15 minutes and then surface". In remote-control operation, processor 1400 may receive the route instructions, or instruction to perform an action, via receiver 1412.

At block 1504, processor 1400 determines its current location and current heading from signals provided by sensor(s) 1404, such as a depth gauge and an electronic compass. This block may be repeated at regular time intervals or upon the occurrence of certain, pre-defined events (i.e., such as when BIV 100 achieves one or more particular depths).

At block 1506, processor 1400 determines a new heading (i.e., a direction and desired depth) based on the route instructions, and its current location and heading.

At block 1508, processor 1400 generates one or more propulsion signals based on the heading for use by actuator 406 to propel BIV 100 along the heading. The propulsion signals may be analog or digital signals that may be provided directly from processor 1400 to actuator 406, or they may be provided to power amplifier 1406 for amplification prior to being provided to actuator 406. The propulsion signals energize actuator 406 to cause tail portion 104 to undulate in a predetermined motion, such as in an anguilliform or carangiform mode, depending how left linkage 408 and right linkage 410 are connected to the inside surface of tail portion 104, or to flexible frame 904. The propulsion signals could, additionally or alternatively, comprise signals to energize thruster 116.

At block 1510, processor 1400 generates one or more dive control signals based on a current depth of BIV 100, a desired depth as indicated by the route instructions, and the speed of BIV 100 based on a pitometer as part of sensor(s) 1404. The dive control signals are provided to one or more electric motors or actuators coupled to dive fins 110, which cause each dive fin to change rotational orientation with respect to a horizontal plane perpendicular to a longitudinal axis of BIV 100. Rotation of dive fins 110 in one direction causes BIV 100 to dive, while rotation of dive fins 110 in an opposing direction causes BIV 100 to ascend, when BIV 100 is being propelled forward.

At block 1512, processor 1400 monitors its position with respect to the heading, and adjusts the propulsion signals to stay on the heading, either by causing actuator 406 to turn faster, by causing actuator 406 to extend its range of motion (i.e., causing arm 218 to maximize its turning arc of travel), and/or by increasing the rotational speed of the fins of thruster 116. In an embodiment where BIV 100 has been programmed to achieve a certain goal, such as finding a marine animal or mapping a bottom surface of an area of an ocean, processor 1400 monitors signals from the sensor(s) 1404 to determine if one or more criteria has been met, such as determining, from a camera, that an object in front of BIV 100 is a particular marine animal or that BIV 100 is five feet from the bottom of a lake.

At block 1514, in one embodiment, processor 1400 may determine that BIV 100 is on a collision course with an object or marine animal by analyzing distance, or range, information from a camera or range detector as part of sensor(s) 1404. For example, sensor(s) 1404 could provide signals to processor 1400 indicative of a distance of an object as BIV 100 is propelled forward through the water. Processor 1400 interprets the signals to determine whether the object is getting closer to BIV 100, and a speed at which the distance between the object and BIV 100 is closing. In response to determining that BIV 100 may collide with the object or marine animal in its path, based on the range and/or the closing speed, processor 1400 generates one or more propulsion signals, one to cause actuator 406 to position and hold tail portion 104 in a fully-flexed position, and another signal to activate thruster 116 (if not already activated) or to or to increase the speed of the thruster fins, in order to cause BIV 100 to pivot quickly out of the way from the object or marine animal. After BIV 100 has avoided the object or marine animal, processor 1400 may resume operations, i.e., resume propulsion signals to actuator 406 and/or thruster 116 at speeds commensurate with achieving the desired route or the desired operational goal.

A similar process may be used to turn BIV 100, for example, to remain on the desired course or to track a moving marine animal. In this embodiment, processor 1400 may determine that a change in direction of BIV 100 is needed, based on the desired route or goal of tracking a marine animal, for example. In response to determining that a change in course is desired, processor 1400 generates one or more propulsion signals, one to cause actuator 406 to position and hold tail portion 104 in a semi or fully-flexed position towards an opposite, desired travel direction (i.e., tail portion 104 positioned to the starboard in order to turn towards the port and vice-versa), and another signal to activate thruster 116 (if not already activated) or to or to increase the speed of the thruster fins, in order to cause BIV 100 to turn in a desired direction. Processor 1400 then determines when BIV 100 has successfully changed course and, in response, may revert back to propelling BIV 100 in a normal manner, i.e., in a mode prior to the turn.

In a related embodiment, processor 1400 changes the speed of the thruster fins at a sinusoidal rate that matches the period over which tail portion 104 undulates over a complete flex cycle (i.e., from a fully flexed position to the starboard, through a straight position, to a fully flexed position to the port, and back again). In other words, the speed of the fins are continuously adjusted as tail portion 104 moves through its undulation, increasing as tail portion 104 approaches the straight position and slowing down, and even stopping, when tail portion 104 is flexed in its maximum position. This embodiment may be used to propel BIV 100 quickly in a straight heading using both oscillatory movement of tail portion 104 plus thruster 116.

In any of the embodiments described above, turning may be achieved remotely when processor 1400 receives instructions to turn via receiver 1412. In this embodiment, BIV 100 may transmit status and information to a remote location via transmitter 1410 and floating platform 1300 and, in response, receive commands to alter the course, speed or depth of BIV 100. Also, alternatively or additionally, processor 1400 may activate dive fins 110 and thruster 116 together for obstacle/marine animal collision avoidance, or to more quickly change depth.

At block 1516, processor 1400 may autonomously perform shoaling or schooling operations, i.e., maintaining proximity to one or more moving marine animals, such as a school of fish, or a whale or dolphin (herein referred to as "shoaling"). This embodiment may be used in applications requiring human or machine observation of fish stock, for example in an aquaculture facility, to determine the presence of sea lice, which typically require high resolution imagery. In cases such as this, it is desirable for BIV 100 to swim among fish for observational purposes. The shoaling or schooling operation is typically performed autonomously by processor 1400, as delays involved with transmitting position and receiving navigational adjustments from a remote location would generally be intolerable.

At block 1518, processor 1400 may enter a shoaling mode of operation, in one embodiment, upon processor 1400 receiving a command via receiver 1412 or, in another embodiment, upon processor 1400 detecting the presence of a desired marine animal or school of marine animals, based on signals from sensor(s) 1404, such as one or more cameras.

At block 1520, processor 1400 may overlay digital images from the one or more cameras with a grid comprising grid points.

At block 1522, one or more marine animals are detected proximate BIV 100 by processor 1400 using image processing techniques such as comparison of images to images or image information stored in memory 1402.

At block 1524, when one or more marine animals are detected, processor 1400 may determine its/their relative velocity with respect to BIV 100 using well-known techniques such as measuring a distance traveled from one image to another image taken at a known time interval after the first image or by range-detection techniques.

At block 1526, a tensor may be calculated and assigned to each of the grid points, based upon the relative speed of the marine animal(s) with respect to BIV 100 and/or its/their direction of motion relative to BIV 100.

At block 1528, processor 1400 enters a feedback loop, where a magnitude of the tensors are evaluated, in one embodiment, predetermined time intervals such as 1 second, and the magnitude of the tensors are then used to control navigation. Processor 1400 controls the speed and direction of BIV 100 using propulsion and dive signals that are provided to actuator 406/thruster 116 and dive fins 110, respectively. Processor 1400 adjusts the speed and direction of BIV to minimize the value of the tensors. In one embodiment, processor 1400 calculates the mean, or average, of the tensors to determine when and how much to adjust the speed and/or direction of BIV 100. Processor 1400 continues to make speed and course adjustments based on the tensors.

At block 1530, processor 1400 determines that the magnitude of the tensors is less than a predetermined amount, indicating that BIV 100 is properly shoaling with the marine animal(s). In response, processor 1400 causes a high-resolution camera, as part of sensor(s) 1404, to provide high-resolution images of the marine animal(s). Underwater, high-resolution images are typically difficult to obtain when BIV 100 is moving relative to a marine animal. Thus, determining when BIV 100 is properly shoaling with a marine animal is an important feature of BIV 100.

At block 1532, processor 1400 stores the high-resolution images in memory 1402.

At block 1534, processor 1400 may receive a command from the remote location to provide any high-resolution images the remote location, as well as status information such as current location, depth, speed, etc.

At block 1536, in response to receiving the command, processor 1400 provides the high resolution images, as well as any other status information requested, to transmitter 1410, causing transmitter 1410 to provide the images and other information to floating platform 1300.

At block 1538, floating platform 1300 transmits the images and other information to the remote location.

The methods or steps described in connection with the embodiments disclosed herein may be embodied directly in hardware or embodied in machine-readable instructions executed by a processor, or a combination of both. The machine-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. In the alternative, the processor and the storage medium may reside as discrete components.

Accordingly, an embodiment of the invention may comprise a non-transitory processor-readable media embodying code or machine-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A biomimetic, underwater vehicle, comprising:
   a head portion;
   a tail portion, the tail portion comprising:
   a flexible skin forming an enclosure that defines a shape of the tail portion;
   an actuator;
   a first linkage comprising a first end coupled to a first portion of the actuator and a second end coupled to a first connection point located at a rear end of the tail portion;
   a second linkage comprising a first end coupled to a second portion of the actuator and a second end coupled to a second connection point located at the rear end of the tail portion; and
   a thruster coupled to a rear portion of the tail portion for providing a second mode of propulsion to the biomimetic, underwater vehicle;
   wherein the flexible skin bends in a first lateral direction when the actuator is activated in a first direction, and bends in a second lateral direction when the actuator is activated in a second direction, providing a first mode of propulsion to the biomimetic, underwater vehicle.

2. The biomimetic, underwater vehicle of claim 1, wherein first mode of propulsion comprises a carangiform mode of propulsion.

3. The biomimetic, underwater vehicle of claim 1, wherein:
   the first linkage is coupled to a third connection point located between the first connection point and the first portion of the actuator; and
   the second linkage is coupled to a fourth connection point between the second connection point and the second portion of the actuator.

4. The biomimetic, underwater vehicle of claim 1, wherein:
   the first linkage is threaded through a third connection point located between the first connection point and the first portion of the actuator; and
   the second linkage is threaded through a fourth connection point located between the second connection point and the second portion of the actuator.

5. The biomimetic, underwater vehicle of claim 4, wherein the tail portion bends at the third connection point and the first connection point when the actuator is activated in the first direction, and the tail portion bends at the fourth connection point and the second connection point, wherein first mode of propulsion comprises an anguilliform mode of propulsion.

6. The biomimetic, underwater vehicle of claim 1, further comprising a mounting bracket disposed at a first end of the tail portion opposite to the rear end of the tail portion and perpendicular to a longitudinal axis of the tail portion, and further comprising a perimeter that forms a ovular cross-section of the biomimetic, underwater vehicle.

7. The biomimetic, underwater vehicle of claim 1, wherein the head portion comprises a fastening device for removably joining the head portion to the tail portion.

8. The biomimetic, underwater vehicle of claim 1, further comprising
   a flexible frame coupled to an inner surface of the flexible skin, wherein the first and second connection points are located at a rear end of the flexible frame.

9. The biomimetic, underwater vehicle of claim 8, wherein the flexible frame comprises an isosceles triangle.

10. The biomimetic, underwater vehicle of claim 8, wherein the actuator is mounted to the flexible frame.

11. The biomimetic, underwater vehicle of claim 10, further comprising:
    a power source coupled to the flexible frame for providing power to the actuator.

12. The biomimetic, underwater vehicle of claim 1, further comprising:
    a third connection point located between the first connection point and the first portion of the actuator; and
    a fourth connection point between the second connection point and the second portion of the actuator;

wherein the first linkage is coupled to the third connection and the second linkage is coupled to the fourth connection, and the tail portion undulates in an anguilliform mode when the first linkage is coupled to both the first connection point and the third connection point and the second linkage is connected to both the second connection point and the fourth connection point, and the tail portion undulates in a carangiform mode when the first linkage is coupled only to the first connection point and the second linkage is coupled only to the second connection.

13. A biomimetic, underwater vehicle, comprising:
a head portion;
a tail portion, the tail portion comprising:
  a flexible skin forming an enclosure that defines a shape of the tail portion;
  an actuator;
  a first linkage comprising a first end coupled to a first portion of the actuator and a second end coupled to a first connection point located at a rear end of the tail portion;
  a second linkage comprising a first end coupled to a second portion of the actuator and a second end coupled to a second connection point located at the rear end of the tail portion;
a camera for generating digital images;
a memory for storing processor-executable instructions; and
a processor coupled to the camera, the memory and the actuator, for executing the processor-executable instructions that causes the biomimetic, underwater vehicle to:
  detect, by the processor, a marine animal proximate to the biomechanical, submersible vehicle;
  determine, by the processor, one or more attributes of the marine animal based on the digital images;
  provide, by the processor, actuator control signals to the actuator that causes the biomimetic, underwater vehicle to shoal with the marine animal;
wherein the flexible skin bends in a first lateral direction when the actuator is activated in a first direction, and bends in a second lateral direction when the actuator is activated in a second direction, providing a first mode of propulsion to the biomimetic, underwater vehicle.

14. The biomimetic, underwater vehicle of claim 13, wherein the instructions that cause the processor to determine the one or more attributes comprises instructions that cause the processor to:
  over lay a grid on top of the digital images, the grid comprising a plurality of grid points;
  determine a relative speed of the marine animal to the biomimetic, underwater vehicle;
  calculate a tensor for each of the plurality of grid points based in the relative speed; and
  adjust the actuator control signals to minimize a magnitude of each of the tensors.

15. The biomimetic, underwater vehicle of claim 14, wherein the camera generates low-resolution images and high-resolution images, and the processor-executable instructions comprise further instructions that cause the processor to:
  store, by the processor, the high-resolution images provided by the camera in the memory when the magnitude of each of the tensors is less than a predetermined threshold.

16. The biomimetic, underwater vehicle of claim 14, further comprising:
  a high-resolution digital camera for providing high-resolution digital images to the processor;
  wherein the processor-executable instructions comprise further instructions that cause the processor to:
  store, by the processor, the high-resolution digital images in the memory when the magnitude of each of the tensors is less than a predetermined threshold.

17. The biomimetic, underwater vehicle of claim 1, further comprising:
  a floating platform configured to float on the surface of an aquatic environment in which the biomimetic, underwater vehicle is operating, the floating platform comprising solar power-generation means and a power cable coupling the solar power-generation means to the biomimetic, underwater vehicle.

18. The biomimetic, underwater vehicle of claim 1, further comprising:
  a floating platform configured to float on the surface of an aquatic environment in which the biomimetic, underwater vehicle is operating, the floating platform comprising a wireless communications receiver for receiving wireless communication signals from a remote location, and a communication cable coupled to the biomimetic, underwater vehicle, for providing the wireless communication signals to the biomimetic, underwater vehicle.

19. A biomimetic, underwater vehicle, comprising:
a head portion;
a tail portion, the tail portion comprising:
  a flexible skin forming an enclosure that defines a shape of the tail portion;
  an actuator;
  a first linkage comprising a first end coupled to a first portion of the actuator and a second end coupled to a first connection point located at a rear end of the tail portion;
  a second linkage comprising a first end coupled to a second portion of the actuator and a second end coupled to a second connection point located at the rear end of the tail portion;
a sensor for generating range information;
a memory for storing processor-executable instructions;
a thruster coupled to a rear portion of the tail portion for providing a second mode of propulsion to the biomimetic, underwater vehicle; and
a processor coupled to the sensor, the memory, the thruster and the actuator, for executing the processor-executable instructions that causes the processor to:
  determine that the biomimetic, underwater vehicle may collide with an object or marine animal;
  in response to determining that the biomimetic, underwater vehicle may collide with an object or marine animal:
    generate an actuator control signal that causes the actuator to position the tail portion at a maximum, flexed position; and
    generate a thruster control signal that causes the thruster to activate;
wherein the flexible skin bends in a first lateral direction when the actuator is activated in a first direction, and bends in a second lateral direction when the actuator is activated in a second direction, providing a first mode of propulsion to the biomimetic, underwater vehicle.

* * * * *